(12) United States Patent
Brake, Jr. et al.

(10) Patent No.: US 7,801,799 B1
(45) Date of Patent: Sep. 21, 2010

(54) CUSTOMER ACTIVATED MULTI-VALUE (CAM) CARD

(75) Inventors: Francis B. Brake, Jr., Swarthmore, PA (US); Deborah Schwartz, Wynnewood, PA (US); Jennifer Zimmerman, Middletown, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 250 days.

(21) Appl. No.: 11/289,872

(22) Filed: Nov. 29, 2005

Related U.S. Application Data

(60) Division of application No. 10/370,227, filed on Feb. 20, 2003, now Pat. No. 7,072,864, which is a division of application No. 09/505,189, filed on Feb. 16, 2000, now Pat. No. 6,865,547, which is a continuation of application No. 09/193,712, filed on Nov. 17, 1998, now Pat. No. 6,032,136.

(51) Int. Cl.
 *G06Q 30/00* (2006.01)
(52) U.S. Cl. .......................................... 705/37; 705/35
(58) Field of Classification Search ............... 705/1–60; 380/1–50; 235/200–380
 See application file for complete search history.

(56) References Cited

U.S. PATENT DOCUMENTS

| | | |
|---|---|---|
| 3,634,669 A | 1/1972 | Soumas et al. |
| 3,938,090 A | 2/1976 | Borison et al. |
| 3,946,206 A | 3/1976 | Darjany |
| 4,047,033 A | 9/1977 | Malmberg et al. |
| 4,058,220 A | 11/1977 | Torongo |

(Continued)

FOREIGN PATENT DOCUMENTS

CA 2293321 6/1998

(Continued)

OTHER PUBLICATIONS

Visa, MBNA and De La Rue Launch Multi-Function Smart Card Program; Jul. 6, 1998, PRNeswire, pp. 1-2.*

(Continued)

*Primary Examiner*—James P Trammell
*Assistant Examiner*—Marissa Liu
(74) *Attorney, Agent, or Firm*—Hunton & Williams LLP

(57) ABSTRACT

The Customer Activated Multi-Value (CAM) card provides a customer with a primary use as a transaction card which can be further activated to have a secondary use as a credit card. The CAM card can be activated as a transaction card or as a transaction card with a credit card feature. Activation of the CAM card as a transaction card allows the customer to purchase goods and services from one specific vendor and to establish a relationship with that vendor for the goods or services rendered (for example, telephone calling card or gasoline product purchasing card) while enjoying reward benefits based on those to purchases. Activation of the credit feature of the card allows the customer to interact with any merchant that accepts traditional credit cards such as VISA®, MASTERCARD®, AMERICAN EXPRESS®, or DISCOVER®. The combination of features allows a customer to purchase various goods and services from several different merchants. If the customer chooses to activate the CAM card as both a transaction card and a credit card, the customer is given the benefit of using the card in both manners described above.

13 Claims, 6 Drawing Sheets

U.S. PATENT DOCUMENTS

| | | |
|---|---|---|
| 4,123,747 A | 10/1978 | Lancto et al. |
| 4,130,881 A | 12/1978 | Haessler et al. |
| 4,453,074 A | 6/1984 | Weinstein |
| 4,454,414 A | 6/1984 | Benton |
| 4,465,206 A | 8/1984 | Sorel et al. |
| 4,545,838 A | 10/1985 | Minkus et al. |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley |
| 4,643,452 A | 2/1987 | Chang et al. |
| 4,650,981 A | 3/1987 | Foletta |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,746,787 A | 5/1988 | Okada et al. |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,845,347 A | 7/1989 | McCrindle et al. |
| 4,851,650 A | 7/1989 | Kitade |
| 4,866,545 A | 9/1989 | LaManna et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,049,728 A | 9/1991 | Rovin |
| 5,055,662 A | 10/1991 | Hasegawa |
| 5,072,380 A | 12/1991 | Randelman et al. |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,163,098 A | 11/1992 | Dahbura |
| 5,175,416 A | 12/1992 | Mansvelt |
| 5,177,342 A | 1/1993 | Adams |
| 5,180,901 A | 1/1993 | Hiramatsu |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,247,190 A | 9/1993 | Friend et al. |
| 5,257,486 A | 11/1993 | Holmwall |
| 5,276,311 A | 1/1994 | Hartmut |
| 5,287,268 A | 2/1994 | McCarthy |
| 5,287,269 A | 2/1994 | Dorrough et al. |
| 5,297,026 A | 3/1994 | Hoffman |
| 5,305,196 A | 4/1994 | Deaton et al. |
| 5,311,594 A | 5/1994 | Penzias |
| 5,326,959 A | 7/1994 | Perazza |
| 5,326,960 A | 7/1994 | Tannenbaum |
| 5,327,508 A | 7/1994 | Deaton et al. |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,380,046 A | 1/1995 | Stephens |
| 5,382,784 A | 1/1995 | Eberhardt |
| 5,383,113 A | 1/1995 | Kight et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,409,092 A | 4/1995 | Itako et al. |
| 5,413,341 A | 5/1995 | Lieberman |
| 5,424,524 A | 6/1995 | Ruppert et al. |
| 5,432,326 A | 7/1995 | Noblett, Jr. et al. |
| 5,440,108 A | 8/1995 | Tran et al. |
| 5,450,477 A | 9/1995 | Amarant et al. |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Malark |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |
| 5,500,890 A | 3/1996 | Rogge et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,537,314 A | 7/1996 | Kanter |
| 5,541,583 A | 7/1996 | Mandelbaum |
| 5,544,086 A | 8/1996 | Davis et al. |
| 5,544,246 A | 8/1996 | Mandelbaum et al. |
| 5,553,120 A | 9/1996 | Katz |
| 5,557,516 A | 9/1996 | Hogan |
| 5,563,934 A | 10/1996 | Eda |
| 5,577,109 A | 11/1996 | Stimson et al. |
| 5,578,808 A | 11/1996 | Taylor |
| 5,581,064 A | 12/1996 | Riley et al. |
| 5,583,933 A | 12/1996 | Mark |

| Patent | Date | Name |
|---|---|---|
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,617,474 A | 4/1997 | Ditzig et al. |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,650,604 A | 7/1997 | Marcous et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,732,136 A * | 3/1998 | Murphree et al. .............. 705/77 |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,555 A | 4/1998 | Mark |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holmann |
| 5,789,733 A | 8/1998 | Jachimowicz et al. |
| 5,790,636 A | 8/1998 | Marshall |
| 5,794,207 A | 8/1998 | Walker |
| 5,796,827 A | 8/1998 | Coppersmith et al. |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,825,871 A | 10/1998 | Mark |
| 5,826,243 A | 10/1998 | Musmanno et al. |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,897,621 A | 4/1999 | Boesch et al. |
| 5,901,303 A | 5/1999 | Chew |
| 5,905,246 A | 5/1999 | Fajkowski |
| 5,907,142 A | 5/1999 | Kelsey |
| 5,907,350 A * | 5/1999 | Nemirofsky .................. 725/23 |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,928,082 A | 7/1999 | Clapper, Jr. |
| 5,930,217 A | 7/1999 | Kayanuma |
| 5,931,764 A | 8/1999 | Freeman et al. |
| 5,933,817 A | 8/1999 | Hucal |
| 5,936,221 A | 8/1999 | Corder et al. |

| | | | | | |
|---|---|---|---|---|---|
| 5,937,068 A | 8/1999 | Audebert | 6,092,056 A | 7/2000 | Tull, Jr. et al. |
| 5,940,811 A | 8/1999 | Norris | 6,092,057 A | 7/2000 | Zimmerman et al. |
| 5,946,669 A | 8/1999 | Polk | 6,095,412 A | 8/2000 | Bertina et al. |
| 5,952,641 A | 9/1999 | Korshun | 6,095,416 A | 8/2000 | Grant et al. |
| 5,953,423 A | 9/1999 | Rosen | 6,098,053 A | 8/2000 | Slater |
| 5,953,710 A | 9/1999 | Fleming | 6,105,006 A | 8/2000 | Davis et al. |
| 5,955,961 A | 9/1999 | Wallerstein | 6,105,008 A | 8/2000 | Davis et al. |
| 5,956,695 A | 9/1999 | Carrithers et al. | 6,105,009 A | 8/2000 | Cuervo |
| 5,963,648 A | 10/1999 | Rosen | 6,105,011 A | 8/2000 | Morrison, Jr. |
| 5,970,469 A | 10/1999 | Scroggie et al. | 6,105,865 A | 8/2000 | Hardesty |
| 5,970,479 A | 10/1999 | Shepherd | 6,109,525 A | 8/2000 | Blomqvist et al. |
| 5,970,480 A | 10/1999 | Kalina | 6,112,191 A | 8/2000 | Burke |
| 5,974,399 A | 10/1999 | Giuliani et al. | 6,115,458 A | 9/2000 | Taskett |
| RE36,365 E | 11/1999 | Levine et al. | 6,119,097 A | 9/2000 | Ibarra |
| 5,979,757 A | 11/1999 | Tracy | 6,119,103 A | 9/2000 | Basch et al. |
| 5,984,180 A | 11/1999 | Albrecht | 6,119,107 A | 9/2000 | Polk |
| 5,984,191 A | 11/1999 | Chapin, Jr. | 6,119,932 A | 9/2000 | Maloney et al. |
| 5,987,434 A | 11/1999 | Libman | 6,122,623 A | 9/2000 | Garman |
| 5,988,509 A | 11/1999 | Taskett | 6,128,598 A | 10/2000 | Walker et al. |
| 5,991,413 A | 11/1999 | Arditti et al. | 6,128,599 A | 10/2000 | Walker et al. |
| 5,991,743 A | 11/1999 | Irving et al. | 6,129,274 A | 10/2000 | Suzuki |
| 5,991,748 A | 11/1999 | Taskett | 6,129,572 A | 10/2000 | Feldman et al. |
| 5,991,750 A | 11/1999 | Watson | 6,134,309 A | 10/2000 | Carson |
| 5,999,596 A | 12/1999 | Walker et al. | 6,134,536 A | 10/2000 | Shepherd |
| 6,000,608 A | 12/1999 | Dorf | 6,138,911 A | 10/2000 | Fredregill et al. |
| 6,000,832 A | 12/1999 | Franklin et al. | 6,138,917 A | 10/2000 | Chapin, Jr. |
| 6,002,383 A | 12/1999 | Shimada | 6,144,848 A | 11/2000 | Walsh et al. |
| 6,003,762 A | 12/1999 | Hayashida | 6,145,741 A | 11/2000 | Wisdom et al. |
| 6,004,681 A | 12/1999 | Epstein et al. | 6,148,297 A | 11/2000 | Swor et al. |
| 6,006,988 A | 12/1999 | Behrmann et al. | 6,161,096 A | 12/2000 | Bell |
| 6,009,415 A | 12/1999 | Shurling et al. | 6,163,770 A | 12/2000 | Gamble et al. |
| 6,014,634 A | 1/2000 | Scroggie et al. | 6,164,533 A | 12/2000 | Barton |
| 6,014,636 A | 1/2000 | Reeder | 6,167,385 A | 12/2000 | Hartley-Urquhart |
| 6,014,638 A | 1/2000 | Burge et al. | 6,169,975 B1 | 1/2001 | White et al. |
| 6,014,645 A | 1/2000 | Cunningham | 6,173,267 B1 | 1/2001 | Cairns |
| 6,014,749 A | 1/2000 | Gloor et al. | 6,179,211 B1 | 1/2001 | Green et al. |
| 6,016,482 A | 1/2000 | Molinari et al. | 6,182,048 B1 | 1/2001 | Osborn et al. |
| 6,016,954 A | 1/2000 | Abe et al. | 6,182,059 B1 | 1/2001 | Angotti et al. |
| 6,019,284 A | 2/2000 | Freeman et al. | 6,182,894 B1 | 2/2001 | Hackett et al. |
| 6,026,370 A | 2/2000 | Jermyn | 6,185,541 B1 | 2/2001 | Scroggie et al. |
| 6,029,139 A | 2/2000 | Cunningham et al. | 6,186,793 B1 | 2/2001 | Brubaker |
| 6,029,144 A | 2/2000 | Barrett et al. | 6,188,309 B1 | 2/2001 | Levine |
| 6,029,890 A | 2/2000 | Austin | 6,189,787 B1 | 2/2001 | Dorf |
| 6,032,136 A | 2/2000 | Brake, Jr. et al. | 6,192,113 B1 | 2/2001 | Lorsch |
| 6,032,859 A | 3/2000 | Muehlberger et al. | 6,192,142 B1 | 2/2001 | Pare, Jr. et al. |
| 6,036,099 A | 3/2000 | Leighton | 6,195,644 B1 | 2/2001 | Bowie |
| 6,038,292 A | 3/2000 | Thomas | 6,202,053 B1 | 3/2001 | Christiansen et al. |
| 6,038,552 A | 3/2000 | Fleischl et al. | RE37,122 E | 4/2001 | Levine et al. |
| 6,041,315 A | 3/2000 | Pollin | 6,213,392 B1 | 4/2001 | Zuppichich |
| 6,044,360 A | 3/2000 | Picciallo | 6,223,143 B1 | 4/2001 | Weinstock et al. |
| 6,045,042 A | 4/2000 | Ohno | 6,227,445 B1 | 5/2001 | Brookner |
| 6,045,050 A | 4/2000 | Ippolito et al. | 6,227,447 B1 | 5/2001 | Campisano |
| 6,047,067 A | 4/2000 | Rosen | 6,227,972 B1 | 5/2001 | Walker et al. |
| 6,047,268 A | 4/2000 | Bartoli et al. | 6,243,688 B1 | 6/2001 | Kalina |
| 6,048,271 A | 4/2000 | Barcelou | 6,260,758 B1 | 7/2001 | Blumberg |
| 6,049,463 A | 4/2000 | O'Malley et al. | 6,263,316 B1 | 7/2001 | Khan et al. |
| 6,049,773 A | 4/2000 | McCormack et al. | 6,265,977 B1 | 7/2001 | Vega et al. |
| 6,049,782 A | 4/2000 | Gottesman et al. | 6,278,981 B1 | 8/2001 | Dembo et al. |
| 6,055,573 A | 4/2000 | Gardenswartz et al. | 6,278,996 B1 | 8/2001 | Richardson et al. |
| 6,058,378 A | 5/2000 | Clark et al. | 6,282,516 B1 | 8/2001 | Giullani |
| 6,061,660 A | 5/2000 | Eggleston et al. | 6,282,522 B1 | 8/2001 | Davis et al. |
| 6,064,985 A | 5/2000 | Anderson | 6,289,322 B1 | 9/2001 | Kitchen et al. |
| 6,065,675 A | 5/2000 | Teicher | 6,292,786 B1 | 9/2001 | Deaton et al. |
| 6,068,183 A | 5/2000 | Freeman et al. | 6,295,344 B1 | 9/2001 | Marshall |
| 6,070,067 A | 5/2000 | Nguyen et al. | 6,295,522 B1 | 9/2001 | Boesch |
| 6,070,147 A | 5/2000 | Harms et al. | 6,298,336 B1 | 10/2001 | Davis et al. |
| 6,070,153 A | 5/2000 | Simpson | 6,308,268 B1 | 10/2001 | Audebert |
| 6,076,068 A | 6/2000 | DeLapa et al. | 6,315,193 B1 | 11/2001 | Hogan |
| 6,076,072 A | 6/2000 | Libman | 6,324,524 B1 | 11/2001 | Lent et al. |
| 6,078,888 A | 6/2000 | Johnson, Jr. | 6,324,526 B1 | 11/2001 | Dagostino |
| 6,078,891 A | 6/2000 | Riordan et al. | 6,327,575 B1 | 12/2001 | Katz |
| 6,085,976 A | 7/2000 | Sehr | 6,330,543 B1 | 12/2001 | Kepecs |
| 6,091,817 A | 7/2000 | Bertina et al. | 6,330,546 B1 | 12/2001 | Gopinathan et al. |

| | | | | | | |
|---|---|---|---|---|---|---|
| 6,336,099 | B1 | 1/2002 | Barnett et al. | 6,615,189 | B1 | 9/2003 | Phillips et al. |
| 6,338,048 | B1 | 1/2002 | Mori | 6,615,190 | B1 | 9/2003 | Slater |
| 6,341,724 | B2 | 1/2002 | Campisano | 6,625,582 | B2 | 9/2003 | Richman et al. |
| 6,343,743 | B1 | 2/2002 | Lamla | 6,631,849 | B2 | 10/2003 | Blossom |
| 6,344,108 | B1 | 2/2002 | Von Medvey et al. | 6,641,049 | B2 | 11/2003 | Luu |
| 6,345,261 | B1 | 2/2002 | Feidelson et al. | 6,641,050 | B2 | 11/2003 | Kelley et al. |
| 6,345,766 | B1 | 2/2002 | Taskett et al. | 6,647,374 | B2 | 11/2003 | Kansal |
| 6,349,291 | B1 | 2/2002 | Varma | 6,655,587 | B2 | 12/2003 | Andrews et al. |
| 6,349,972 | B1 | 2/2002 | Geiger et al. | 6,659,259 | B2 | 12/2003 | Knox et al. |
| 6,351,735 | B1 | 2/2002 | Deaton et al. | 6,671,673 | B1 | 12/2003 | Baseman et al. |
| 6,360,954 | B1 | 3/2002 | Barnardo | 6,675,127 | B2 | 1/2004 | LaBlanc et al. |
| 6,366,220 | B1 | 4/2002 | Elliott | 6,675,149 | B1 | 1/2004 | Ruffin et al. |
| 6,373,969 | B1 | 4/2002 | Adler | 6,693,544 | B1 | 2/2004 | Hebbecker |
| 6,374,230 | B1 | 4/2002 | Walker et al. | 6,705,518 | B2 | 3/2004 | Park et al. |
| 6,377,669 | B1 | 4/2002 | Walker et al. | 6,727,802 | B2 | 4/2004 | Kelly et al. |
| 6,377,935 | B1 | 4/2002 | Deaton et al. | 6,732,919 | B2 | 5/2004 | Macklin et al. |
| 6,385,591 | B1 | 5/2002 | Mankoff | 6,742,125 | B1 | 5/2004 | Gabber et al. |
| 6,385,594 | B1 | 5/2002 | Lebda et al. | D490,840 | S | 6/2004 | Arakaki et al. |
| 6,386,444 | B1 | 5/2002 | Sullivan | D491,186 | S | 6/2004 | Arakaki et al. |
| 6,397,202 | B1 | 5/2002 | Higgins et al. | D491,953 | S | 6/2004 | Arakaki et al. |
| 6,402,039 | B1 | 6/2002 | Freeman et al. | 6,742,704 | B2 | 6/2004 | Fitzmaurice et al. |
| 6,405,182 | B1 | 6/2002 | Cuervo | 6,745,938 | B2 | 6/2004 | Sullivan |
| 6,409,593 | B1 | 6/2002 | Petrecca | 6,757,660 | B2 | 6/2004 | Canada et al. |
| 6,411,947 | B1 | 6/2002 | Rice et al. | 6,757,710 | B2 | 6/2004 | Reed |
| 6,419,161 | B1 | 7/2002 | Haddad | D496,365 | S | 9/2004 | Liu et al. |
| 6,422,459 | B1 | 7/2002 | Kawan | 6,793,131 | B2 | 9/2004 | Hogan |
| 6,422,462 | B1 | 7/2002 | Cohen | 6,793,135 | B1 | 9/2004 | Ryoo |
| 6,424,029 | B1 | 7/2002 | Giesler | 6,802,008 | B1 | 10/2004 | Ikefuji et al. |
| 6,429,927 | B1 | 8/2002 | Borza | 6,805,287 | B2 | 10/2004 | Bishop et al. |
| 6,434,259 | B1 | 8/2002 | Hamid et al. | 6,805,289 | B2 | 10/2004 | Noriega et al. |
| D462,477 | S | 9/2002 | Osborne | D498,236 | S | 11/2004 | Liu et al. |
| 6,446,210 | B1 | 9/2002 | Borza | 6,814,282 | B2 | 11/2004 | Seifert et al. |
| 6,450,407 | B1 | 9/2002 | Freeman et al. | 6,820,061 | B2 | 11/2004 | Postrel |
| 6,454,647 | B1 | 9/2002 | Woodbury, Jr. | 6,829,586 | B2 | 12/2004 | Postrel |
| 6,456,981 | B1 | 9/2002 | Dejaeger et al. | 6,834,796 | B2 | 12/2004 | Anvekar et al. |
| 6,463,039 | B1 | 10/2002 | Ricci et al. | 6,842,739 | B2 | 1/2005 | Postrel |
| 6,467,684 | B2 | 10/2002 | Fite et al. | 6,856,973 | B1 | 2/2005 | Bott |
| 6,473,500 | B1 | 10/2002 | Risafi et al. | 6,865,547 | B1 | 3/2005 | Brake Jr. et al. |
| 6,481,125 | B1 | 11/2002 | Pokrasoff | 6,868,426 | B1 | 3/2005 | Mankoff |
| 6,484,144 | B2 | 11/2002 | Martin et al. | 6,876,971 | B1 | 4/2005 | Burke |
| 6,484,148 | B1 | 11/2002 | Boyd | 6,880,084 | B1 | 4/2005 | Brittenham et al. |
| 6,484,428 | B1 | 11/2002 | Greenwald et al. | 6,885,994 | B1 | 4/2005 | Scroggie et al. |
| D466,929 | S | 12/2002 | Haas | 6,886,046 | B2 | 4/2005 | Stutz et al. |
| D467,271 | S | 12/2002 | Haas | 6,892,187 | B2 | 5/2005 | Phillips et al. |
| D467,272 | S | 12/2002 | Haas | 6,895,383 | B2 | 5/2005 | Heinrich |
| 6,498,861 | B1 | 12/2002 | Hamid et al. | 6,895,386 | B1 | 5/2005 | Bachman et al. |
| D468,789 | S | 1/2003 | Arnold et al. | 6,901,372 | B1 | 5/2005 | Helzerman |
| 6,505,095 | B1 | 1/2003 | Kolls | 6,912,502 | B1 | 6/2005 | Buddle et al. |
| 6,505,168 | B1 | 1/2003 | Rothman et al. | 6,913,193 | B1 | 7/2005 | Kawan |
| 6,505,780 | B1 | 1/2003 | Yassin et al. | 6,942,569 | B2 | 9/2005 | Petracca |
| 6,507,644 | B1 | 1/2003 | Henderson et al. | 6,945,453 | B1 | 9/2005 | Schwarz Jr. |
| 6,529,880 | B1 | 3/2003 | McKeen et al. | 6,947,898 | B2 | 9/2005 | Postrel |
| D474,235 | S | 5/2003 | Haas | 6,954,741 | B1 | 10/2005 | Burchetta et al. |
| 6,557,750 | B1 | 5/2003 | Druse et al. | 6,961,710 | B1 | 11/2005 | Yanagisawa et al. |
| 6,557,766 | B1 | 5/2003 | Leighton | 6,970,830 | B1 | 11/2005 | Samra et al. |
| 6,558,255 | B2 | 5/2003 | Walker et al. | 6,978,369 | B2 | 12/2005 | Wheeler et al. |
| 6,560,578 | B2 | 5/2003 | Eldering | 6,999,569 | B2 | 2/2006 | Risafi et al. |
| 6,560,581 | B1 | 5/2003 | Fox et al. | 6,999,938 | B1 | 2/2006 | Libman |
| 6,567,786 | B1 | 5/2003 | Bibelnieks et al. | 6,999,943 | B1 | 2/2006 | Johnson et al. |
| 6,567,821 | B1 | 5/2003 | Polk | 7,006,992 | B1 | 2/2006 | Packwood |
| 6,574,603 | B1 | 6/2003 | Dickson et al. | 7,014,110 | B2 | 3/2006 | Minowa et al. |
| 6,575,361 | B1 | 6/2003 | Graves et al. | 7,024,374 | B1 | 4/2006 | Day et al. |
| 6,581,839 | B1 | 6/2003 | Lasch et al. | 7,039,600 | B1 | 5/2006 | Meek et al. |
| 6,581,845 | B2 | 6/2003 | Ye | 7,051,925 | B2 | 5/2006 | Schwarz, Jr. |
| D476,681 | S | 7/2003 | Al Amri | 7,051,929 | B2 | 5/2006 | Li |
| D477,359 | S | 7/2003 | Haas | 7,054,842 | B2 | 5/2006 | James et al. |
| 6,594,640 | B1 | 7/2003 | Postrel | 7,070,095 | B1 | 7/2006 | Gandel et al. |
| 6,601,040 | B1 | 7/2003 | Kolls | 7,072,864 | B2 | 7/2006 | Brake, Jr. et al. |
| 6,601,761 | B1 | 8/2003 | Katis | 7,072,909 | B2 | 7/2006 | Polk |
| 6,607,127 | B2 | 8/2003 | Wong | 7,076,465 | B1 | 7/2006 | Blagg et al. |
| 6,609,111 | B1 | 8/2003 | Bell | 7,082,416 | B2 | 7/2006 | Anderson |
| 6,609,658 | B2 | 8/2003 | Sehr | 7,083,084 | B2 | 8/2006 | Graves et al. |
| RE38,255 | E | 9/2003 | Levine et al. | 7,089,503 | B1 | 8/2006 | Bloomquist et al. |

| | | | | | |
|---|---|---|---|---|---|
| 7,092,905 B2 | 8/2006 | Behrenbrinker et al. | 2002/0099586 A1 | 7/2002 | Bladen et al. |
| 7,092,916 B2 | 8/2006 | Diveley | 2002/0099667 A1 | 7/2002 | Diamandis et al. |
| 7,104,443 B1 | 9/2006 | Paul et al. | 2002/0104878 A1 | 8/2002 | Seifert et al. |
| 7,107,249 B2 | 9/2006 | Dively | 2002/0111886 A1 | 8/2002 | Chenevich et al. |
| 7,113,914 B1 | 9/2006 | Spielmann et al. | 2002/0111916 A1 | 8/2002 | Coronna et al. |
| 7,156,301 B1 | 1/2007 | Bonalle et al. | 2002/0116271 A1 | 8/2002 | Mankoff |
| 7,163,153 B2 | 1/2007 | Blossom | 2002/0116330 A1 | 8/2002 | Hed et al. |
| 7,165,049 B2 | 1/2007 | Slater | 2002/0117541 A1 | 8/2002 | Biggar et al. |
| 7,167,844 B1 | 1/2007 | Leong et al. | 2002/0120627 A1 | 8/2002 | Mankoff |
| 7,191,952 B2 | 3/2007 | Blossom | 2002/0120642 A1 | 8/2002 | Fetherston |
| 7,195,154 B2 | 3/2007 | Routhenstein | 2002/0129221 A1 | 9/2002 | Borgia et al. |
| 7,216,091 B1 | 5/2007 | Blandina et al. | 2002/0133461 A1 | 9/2002 | Ramachandran |
| 7,225,155 B1 | 5/2007 | Polk | 2002/0138418 A1 | 9/2002 | Zarin et al. |
| 7,228,155 B2 | 6/2007 | Saunders | 2002/0139843 A1 | 10/2002 | Park et al. |
| 7,243,839 B2 | 7/2007 | Beck et al. | 2002/0143703 A1 | 10/2002 | Razvan et al. |
| 7,249,092 B2 | 7/2007 | Dunn et al. | 2002/0145039 A1 | 10/2002 | Carroll |
| 7,249,112 B2 | 7/2007 | Berardi et al. | 2002/0147662 A1 | 10/2002 | Anderson |
| 7,252,223 B2 | 8/2007 | Schofield | 2002/0147683 A1 | 10/2002 | Capobianco et al. |
| 7,252,226 B2 | 8/2007 | Risafi et al. | 2002/0152168 A1 | 10/2002 | Neofytides et al. |
| 7,306,141 B1 | 12/2007 | Schwarz, Jr. | 2002/0156723 A1 | 10/2002 | Lilly et al. |
| 7,311,244 B1 | 12/2007 | Schwarz, Jr. | 2002/0161702 A1 | 10/2002 | Milberger et al. |
| 7,312,707 B1 | 12/2007 | Bishop et al. | 2002/0165771 A1 | 11/2002 | Walker et al. |
| 7,315,843 B2 | 1/2008 | Diveley et al. | 2002/0165820 A1 | 11/2002 | Anvekar et al. |
| 7,349,866 B2 | 3/2008 | Schwarz, Jr. | 2002/0169719 A1 | 11/2002 | Dively et al. |
| 7,357,331 B2 | 4/2008 | Blossom | 2002/0174016 A1 | 11/2002 | Cuervo |
| 7,392,221 B2 | 6/2008 | Nabe | 2002/0174018 A1 | 11/2002 | Bunger et al. |
| 7,392,224 B1 | 6/2008 | Bauer et al. | 2002/0174030 A1 | 11/2002 | Praisner et al. |
| 7,398,248 B2 | 7/2008 | Phillips et al. | 2002/0178025 A1 | 11/2002 | Hansen et al. |
| 7,401,049 B2 | 7/2008 | Hobbs et al. | 2002/0178063 A1 | 11/2002 | Gravelle et al. |
| D582,476 S | 12/2008 | Field et al. | 2002/0190123 A1 | 12/2002 | Anvekar et al. |
| D582,977 S | 12/2008 | Field et al. | 2002/0194081 A1 | 12/2002 | Perkowski |
| 7,493,288 B2 | 2/2009 | Biship et al. | 2002/0194124 A1 | 12/2002 | Hobbs et al. |
| 7,506,806 B2 | 3/2009 | Bonalle et al. | 2003/0004828 A1 | 1/2003 | Epstein |
| 7,591,416 B2 | 9/2009 | Blossom | 2003/0010831 A1 | 1/2003 | Ye |
| D602,522 S | 10/2009 | Field et al. | 2003/0018613 A1 | 1/2003 | Oytac |
| 7,606,730 B2 | 10/2009 | Antonucci | 2003/0023549 A1 | 1/2003 | Armes et al. |
| 2001/0001856 A1 | 5/2001 | Gould et al. | 2003/0028483 A1 | 2/2003 | Sanders et al. |
| 2001/0002487 A1 | 5/2001 | Grawrock et al. | 2003/0028518 A1 | 2/2003 | Mankoff |
| 2001/0011227 A1 | 8/2001 | Ashery et al. | 2003/0031321 A1 | 2/2003 | Mages |
| 2001/0011243 A1 | 8/2001 | Dembo et al. | 2003/0033211 A1 | 2/2003 | Haines et al. |
| 2001/0027441 A1 | 10/2001 | Wankmueller | 2003/0033246 A1 | 2/2003 | Slater |
| 2001/0032312 A1 | 10/2001 | Runje et al. | 2003/0040927 A1 | 2/2003 | Sato et al. |
| 2001/0034647 A1 | 10/2001 | Marks et al. | 2003/0046249 A1 | 3/2003 | Wu |
| 2001/0034663 A1 | 10/2001 | Teveler et al. | 2003/0053609 A1 | 3/2003 | Risafi et al. |
| 2001/0034682 A1 | 10/2001 | Knight et al. | 2003/0055780 A1 | 3/2003 | Hansen et al. |
| 2001/0037315 A1 | 11/2001 | Saliba et al. | 2003/0055782 A1 | 3/2003 | Slater |
| 2001/0044293 A1 | 11/2001 | Morgan | 2003/0061168 A1 | 3/2003 | Routhenstein |
| 2001/0044733 A1 | 11/2001 | Lee et al. | 2003/0065624 A1 | 4/2003 | James et al. |
| 2001/0047332 A1 | 11/2001 | Gonen-Friedman et al. | 2003/0074167 A1 | 4/2003 | Browne et al. |
| 2001/0047342 A1 | 11/2001 | Cuervo | 2003/0085272 A1 | 5/2003 | Andrews et al. |
| 2001/0054003 A1 | 12/2001 | Chien et al. | 2003/0085286 A1 | 5/2003 | Kelley et al. |
| 2001/0056398 A1 | 12/2001 | Scheirer | 2003/0101119 A1 | 5/2003 | Parsons et al. |
| 2002/0010591 A1 | 1/2002 | Pomerance | 2003/0105672 A1 | 6/2003 | Epstein et al. |
| 2002/0019793 A1 | 2/2002 | Frattalone | 2003/0105714 A1 | 6/2003 | Alarcon-Luther et al. |
| 2002/0019803 A1 | 2/2002 | Muller | 2003/0110111 A1 | 6/2003 | Nalebuff et al. |
| 2002/0026416 A1 | 2/2002 | Provinse | 2003/0130940 A1 | 7/2003 | Hansen et al. |
| 2002/0026418 A1 | 2/2002 | Koppel et al. | 2003/0130948 A1 | 7/2003 | Algiene et al. |
| 2002/0032609 A1 | 3/2002 | Wilkman | 2003/0135453 A1 | 7/2003 | Caulfield et al. |
| 2002/0046089 A1 | 4/2002 | Zorn | 2003/0135459 A1 | 7/2003 | Abelman et al. |
| 2002/0046255 A1 | 4/2002 | Moore et al. | 2003/0135462 A1 | 7/2003 | Brake, Jr. et al. |
| 2002/0062235 A1 | 5/2002 | Wahlbin et al. | 2003/0140004 A1 | 7/2003 | O'Leary et al. |
| 2002/0062279 A1 | 5/2002 | Behrenbrinker et al. | 2003/0144935 A1 | 7/2003 | Sobek |
| 2002/0065712 A1 | 5/2002 | Kawan et al. | 2003/0149660 A1 | 8/2003 | Canfield |
| 2002/0065720 A1 | 5/2002 | Carswell et al. | 2003/0154125 A1 | 8/2003 | Mittal et al. |
| 2002/0073030 A1 | 6/2002 | Offer | 2003/0154163 A1 | 8/2003 | Phillips et al. |
| 2002/0077964 A1 | 6/2002 | Brody et al. | 2003/0163403 A1 | 8/2003 | Chen et al. |
| 2002/0077978 A1 | 6/2002 | O'Leary et al. | 2003/0163416 A1 | 8/2003 | Kitajima |
| 2002/0082990 A1 | 6/2002 | Jones | 2003/0167218 A1 | 9/2003 | Field et al. |
| 2002/0091572 A1 | 7/2002 | Anderson et al. | 2003/0172040 A1 | 9/2003 | Kemper et al. |
| 2002/0091631 A1 | 7/2002 | Usui | 2003/0182246 A1 | 9/2003 | Johnson et al. |
| 2002/0091632 A1 | 7/2002 | Turock et al. | 2003/0187787 A1 | 10/2003 | Freund |
| 2002/0091649 A1 | 7/2002 | Anvekar et al. | 2003/0195808 A1 | 10/2003 | Brown et al. |
| 2002/0095365 A1 | 7/2002 | Slavin et al. | 2003/0195842 A1 | 10/2003 | Reece |

| | | | |
|---|---|---|---|
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0204421 A1 | 10/2003 | Houle et al. |
| 2003/0205616 A1 | 11/2003 | Graves et al. |
| 2003/0213843 A1 | 11/2003 | Jackson |
| 2003/0216965 A1 | 11/2003 | Libman |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0222136 A1 | 12/2003 | Bolle et al. |
| 2003/0229525 A1 | 12/2003 | Callahan et al. |
| 2003/0236704 A1 | 12/2003 | Antonucci |
| 2004/0024672 A1 | 2/2004 | Brake, Jr. et al. |
| 2004/0024693 A1 | 2/2004 | Lawrence |
| 2004/0029569 A1 | 2/2004 | Khan et al. |
| 2004/0030626 A1 | 2/2004 | Libman |
| 2004/0039588 A1 | 2/2004 | Libman |
| 2004/0049452 A1 | 3/2004 | Blagg |
| 2004/0059952 A1 | 3/2004 | Newport et al. |
| 2004/0064332 A1 | 4/2004 | Zou et al. |
| 2004/0064402 A1 | 4/2004 | Dreyer et al. |
| 2004/0088238 A1 | 5/2004 | Gilson et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0118914 A1 | 6/2004 | Smith et al. |
| 2004/0128186 A1 | 7/2004 | Breslin et al. |
| 2004/0128195 A1 | 7/2004 | Sorem |
| 2004/0133787 A1 | 7/2004 | Doughty et al. |
| 2004/0149544 A1 | 8/2004 | Dal Ferro |
| 2004/0155101 A1 | 8/2004 | Royer et al. |
| 2004/0159700 A1 | 8/2004 | Khan et al. |
| 2004/0193539 A1 | 9/2004 | Sullivan |
| 2004/0210498 A1 | 10/2004 | Freund |
| 2004/0215507 A1 | 10/2004 | Levitt et al. |
| 2004/0232223 A1 | 11/2004 | Beenau et al. |
| 2004/0236688 A1 | 11/2004 | Bozeman |
| 2004/0239481 A1 | 12/2004 | Beenau et al. |
| 2004/0242308 A1 | 12/2004 | Gray |
| 2004/0243498 A1 | 12/2004 | Duke |
| 2004/0252012 A1 | 12/2004 | Beenau et al. |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0077349 A1 | 4/2005 | Bonalle et al. |
| 2005/0091138 A1 | 4/2005 | Awatsu |
| 2005/0091492 A1 | 4/2005 | Benson et al. |
| 2005/0114883 A1 | 5/2005 | Nagai et al. |
| 2005/0116024 A1 | 6/2005 | Beenau et al. |
| 2005/0119979 A1 | 6/2005 | Murashita et al. |
| 2005/0167488 A1 | 8/2005 | Higgins et al. |
| 2005/0171842 A1 | 8/2005 | Tien et al. |
| 2005/0171898 A1 | 8/2005 | Bishop et al. |
| 2005/0179251 A1 | 8/2005 | Wagoner et al. |
| 2005/0189427 A1 | 9/2005 | Brown et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2005/0289044 A1 | 12/2005 | Breslin et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0047573 A1 | 3/2006 | Mitchell et al. |
| 2006/0047589 A1 | 3/2006 | Grau |
| 2006/0074794 A1 | 4/2006 | Nespola |
| 2006/0085334 A1 | 4/2006 | Murphy |
| 2006/0106696 A1 | 5/2006 | Carlson |
| 2006/0116955 A1 | 6/2006 | Strayer et al. |
| 2006/0122918 A1 | 6/2006 | Graboske et al. |
| 2006/0157557 A1 | 7/2006 | Lee et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0259364 A1 | 11/2006 | Strock et al. |
| 2006/0261927 A1 | 11/2006 | Kelly et al. |
| 2006/0289636 A1 | 12/2006 | Hoblit |
| 2007/0034700 A1 | 2/2007 | Poidomani et al. |
| 2007/0063025 A1 | 3/2007 | Blossom |
| 2007/0078719 A1 | 4/2007 | Schmitt et al. |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0265924 A1 | 11/2007 | Schwarz |
| 2008/0005018 A1 | 1/2008 | Powell |
| 2008/0010202 A1 | 1/2008 | Schwarz |
| 2008/0027841 A1 | 1/2008 | Eder |
| 2008/0177659 A1 | 7/2008 | Lacey et al. |
| 2008/0230600 A1 | 9/2008 | Black et al. |
| 2009/0043651 A1 | 2/2009 | Schwarz, Jr. |
| 2009/0048972 A1 | 2/2009 | Bierer et al. |
| 2009/0150370 A1 | 6/2009 | Christensen et al. |
| 2009/0261161 A1 | 10/2009 | Blossom |
| 2009/0265275 A1 | 10/2009 | Everhart |
| 2009/0271853 A1 | 10/2009 | Everhart |

FOREIGN PATENT DOCUMENTS

| | | |
|---|---|---|
| EP | 0843292 A2 | 5/1998 |
| EP | 0855659 | 7/1998 |
| EP | 959440 A2 | 11/1999 |
| GB | 2275654 A | 9/1994 |
| GB | 2376787 A | 12/2002 |
| GB | 2377071 A | 12/2002 |
| GB | 2377314 A | 1/2003 |
| WO | WO 94/29112 | 12/1994 |
| WO | WO 97/41673 | 11/1997 |
| WO | WO 9810368 | 3/1998 |
| WO | WO 98/59307 | 12/1998 |
| WO | WO 99/05633 | 2/1999 |
| WO | WO 01/18699 | 3/2001 |
| WO | WO 01/69347 A2 | 9/2001 |
| WO | WO 0188659 | 11/2001 |
| WO | WO 2005/043277 A2 | 5/2005 |
| WO | WO 2005101975 | 11/2005 |
| WO | WO 2006060370 | 6/2006 |
| WO | WO 2006105092 | 10/2006 |
| WO | WO 2006116772 | 11/2006 |
| WO | WO 2008021381 | 2/2008 |
| WO | WO 2008021382 | 2/2008 |
| WO | WO 2009023817 | 2/2009 |

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks For ID, Time Magazine, Apr. 12, 2004, 1 page.

A Store Card Issuer Looks for Lift from Electronic Gift Certificates, Credit Card News, Feb. 1, 1995, 2 pages.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

Associates First Capital Corporation, Hoover's Inc., The Industry Standard: The Newsmagazine of the Internet Economy, thestandard.net/companies/company-display, Apr. 6, 1999.

Award Card Comparison, JA7922.

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CES/NaBANCO introduces stored value card technology blockbuster video is first merchant partner, Business Wire, Inc., Jan. 15, 1996.

CardEx Incentives, www.cardex.com, Apr. 6, 1999.

CardFlash, Apr. 5, 2005.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Rosen, Cash Just Isn't Flexible Enough: Shops of the Future Will Only Take Cards, Daily Express, Technology Section, Feb. 10, 1995, 1 page.

Bank, Cash, Check,Charge—What's Next?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environmental risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.

Consortium created to manage common electronic purse specification, Cardtech Securtech, Chicago, www.visa.com/av/news/PRmisc051199.vhtml, May 11, 1999.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying by Credit Card-Real World and Online, http://www.virtualschooledu/mon/ElectronicProperty/klamond/credit, printed Jul. 8, 2005, 17 pages.

D.C. Area Safeway Stores Look for Increase in Sales Volume and Revenue with Cards, Card News, vol. 6, No. 25, Dec. 30, 1991, pp. 7-9.

Piskora, Debit Cards Seen Poised for New Markets, American Banker, Credit/Debit/ATMs, Mar. 7, 1995, p. 16.

E-Z Pass, Web page, http://www.ezpass.com-Disc_portNewYork.html, Nov. 12, 2001.

E-Z Pass, Web page, http:\\www.ezpass.com-Disc_ny_annual.html, Nov. 12, 2001.

E-Z Pass, Web page, http:\\www.ezpass.com-frameMain.html, Nov. 12, 2001.

E-Z Pass, Web page, http:\\www.ezpass.com-whatis.html, Nov. 12, 2001.

Business Times, Electronic Purse Can Free You from ATM Drag, Business Times, www.btimes.co.za, printed Feb. 23, 2001, 1 page.

Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

First Data markets stored-value cards, Cards International, Jan. 30, 1996, p. 5.

First USA—Activate Today and Get One Hour Free Calling Card Calls, Call 1-800-555-2535, First USA, 6 pages.

First USA—Call 1(800)335-2453 to Receive One Free Hour of Domestic Long Distance Calling (No Strings Attached), First USA, 6 pages.

First USA Platinum Connect, First USA Bank, First USA Promotional Mailing, Oct. 1997, 6 pages.

First Union Issues Smart Cards to Fort Benning Recruits, CardFax, vol. 1999, No. 60, Mar. 26, 1999, 1 page.

Norris, First Data unit develops Blockbuster cash card, Omaha World Hearld Sunrise Edition, Business Section, Jan. 19, 1996, p. 16.

Frequently asked questions, ECARD, www.eregard.com, printed Sep. 23, 2001, 7 pages.

Machlis, Have it the smart way: Burger King program dives smartcard use, Computerworld, printed Feb. 23, 2001, 1 page.

Here's the calling convenience you asked for: 1-800-call-ATT . . . For All Calls, AT&T, Appendix A: For Card Carriers, 1999, 7 pages.

Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.

How Is It Different?, JA8331.

Konrad, IBM Had a Bunch of Unusual Ideas in 2003, www.philly.com, printed Jan. 21, 2004, posted on Jan. 13, 2004, 2 pages.

Incenticard, Bellsouth, JA8329.

Incentive Firms Find Debit Cards A Rewarding Experience (Off-line debit card issuers converge efforts with companies looking for effective incentives to boost employee productivity and to motivate individuals to buy their products), Debit Card News, Vol.

Coulton, Incentives Field Moving to Card-Based Series 14, American Banker, Mar. 26, 1998, 3 pages.

Introducing SpendingMoney(TM), Armetta: Marketing & Design Product Concept Report, Oct. 9, 1996, 15 pages.

Introducing the First USA Platinum Connect Card, First USA Promotional Mailing, Dec. 1997, 2 pages.

Key Bank Holiday Offer, http://www.key.com/swiftgift/home.html, printed Apr. 5, 1999.

MailFrontier Survey Finds that Consumers Hold Financial Institutions Accountable for Online Identitiy Theft, www.mailfrontier.com, Palo Alto, CA, Nov. 2004.

O'Conner, Maritz Gets MasterCard's Stamp of Approval, Business Travel News, Aug. 19, 1996, 2 pages.

Meridian Award Cards, JA8251.

Card Based Award Systems, JA8309.

Meridian-the leader in card marketing, JA8343.

Meridicard vs. Debit Cards, JA7917.

Clark, Microsoft, Visa to Jointly Develop PC Electronic-Shopping Software, The Wall Street Journal, Nov. 9, 1994, WSJ B9.

More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Schwab, Charles, Now 7 Ways for a better Total Return for Your Money; Schwat 1, The Inventor's Asset Management Account, Charles R. Schwab, Charles Schwab & Co., Inc., 16 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases Visa Cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, Card Ex website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Machlis et al., Will smart cards replace ATMS?, Computerworld, printed Feb. 23, 2001, 3 pages.
Delivering the Right Information to the Right Resource or Every Customer Interaction; Intelligent Callrouter, www.geotel.com/solutions/icr/default/htm, 1998, 1 page.

Claessens, et al., A Tangled World Wide Web of Security Issues, First Monday, retrieved from the internet at http://www.firstmonday.org/issues/issue7_3/claessens, retrieved from the internet on Oct. 6, 2006.
American Express Incentive Services, Incentive, Sep. 1996, p. 126.
Hight, Jim, Consulting Services, www.strategies-tactics.com.
Nora Wood, Corporate Spotlight, Incentive, Dec. 1997, 4 pages.
Definition of Store-Value Card, Wikipedia, retrieved from the internet at http://en.wikipedia.org/wiki/Stored-value_card, retrieved from the internet on Apr. 16, 2007.
Eight Keys to Making the Right Choice, Incentive, Dec. 1996, 9 pages.
D. O'Mahony, Electronic Payment System, 1997, Artech House, XP002137255, p. 7-11.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
Glossman, et al.,, Glossman, et al., Citicorp Company Report, Report No. 1647151, p. 8 of 16.
Hamey, Kenneth, Home Asset Management Accounts Link Mortgages Equity Lines.
Judy Quinn, Incentive Cards Explained, Incentive, Dec. 1995, 5 pages.
Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
Maritz, Incentive, Jun. 1996, p. 111.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Rossman, Kenneth, Summary Appraisal of Real Property.
The Federal Transit Administration, TCRP Report 32 Multipurpose Transit Payment Media, Chapter 2 Multipurpose Fare Payment: Overview, p. 10-20.
Nora Wood, The Power of the Card, Incentive, Jul. 1997, 6 pages.
Wells Fargo Blazes New Trail for Homeowners.
Kenneth Hein, What's the Deal?, Incentive, Jul. 1998, 7 pages.
"In Time of Need: A National Strategy for Disaster Relief Cards," prepared by JPMorgan Chase Treasury Services—Public Sector, Jan. 26, 2007.
A Survey and White Paper of the EBT Industry Council, "Debit and Stored Value Cards for Government: A Growing Trend but States Could Do More," EFTA, Nov. 2006.
4.1.2 Kolmogorov Smirnov Test.
Hasting, Nelson et al., A Case Study of Authenticated and Secure File Transfer The Iowa Campaign Finance Reporting System.
Tam, Vincent, et. al., A Fast and Flexible Framework of Scripting for Web Application Development: A Preliminary Experience Report.
Hekman, Christine, A Financial Model of Foreign Exchange Exposure.
American Banker Publications, A Glossary of Computer Technology Terms.
A Guide to the Language of the Futures Industry.
Unknown, ABA Banking Journal; The front end and back end functions of item processing will benefit from the technological advances of imaging; Mar. 1990; acs01038997.
Coca-Cola ATM Monery Cards, Retrieved from the Internet at: http://www.cardweb.com/cardtrak/news/cf4_4a_97.html, Apr. 4, 1997, ACS 012.
Arend, Mark; Bank applications fuel optical storage market; ABA Banking Journal; Oct. 1991; acs01039000.

Abstract to 2007 JPMorgan Chase Disaster Response Card National Strategy Plan Abstract.

Siegel, Joel G., et. al., Accounting Handbook, Second Edition (1995).

Unknown, Alabama department of revenue selects Unisys for imaging solution to speed tax returns, save taxpayers money; Sep. 6, 1995; acs01039064.

AmEx-Costco Co-brand Is it a Marketing or Merchant Acceptance Strategy.

None, American Express and Starwood Launch The New Starwood Preferred Guest SM Credit Card from American Express.

Roodyn, Neil, et al., An Architectural Style for Multiple Real-Time Data Feeds.

Anonymous, Anonymous.

Answers.com.

The State of Arkansas, Arkansas Code of 1987 Annotated.

Authorization of Financial Agent and Terms of Performance, Debit Card Application for Houston, Texas, Sep. 1991, acs00277412.

E-Loan, Auto Loan Rates.

Urrows, Henry et. al., Automated Imaging in Financial Services.

Plotnick, Jennifer, Bakersfield Calif Investors Explore Buying Rental Property; Apr. 11, 2004.

Unknown, BancTec selects alchemy CD-Based archival solution for remittance processing system; May 6, 1998; acs01039047.

Keeton, Ann, Bank of America completes its rollout of 'paperless' processing of payments; Nov. 1, 1999; acs01039334.

Stanley, Susan et al., Bank of America provides nationwide image lockbox services; Oct. 20, 1999; acs01039405.

Barr, Michael, Banking the Poor.

Ceramic Industry, Behind the Scenes with Bruce Cowgill.

Board of Governors of the Federal Reserve System—Report to the Congress on the Application of the Electronic Fund Transfer Act to Electronic Stored-Value Products, May 1997, acs00098020.

Pae, Peter, Boycott Threat Spurs American Express to Rethink Fees.

Kiley, Kathleen, Branded.

Business Wire; 1A Corp. wins contract with comerica to install the first digital all items archive, one of nation's top 25 bank holding companies expects to streamline operations. . . ; Jan. 9, 1997; acs01039033.

Business Wire; IA Corp. shows complex transaction processing software Work vision at AIIM, plus Check Vision and Remit Vision application frameworks for new advanced banking services. . . ; Apr. 14, 1997; acs01039025.

Business Wire; Shawnut bank provides lockbox customers real-time, on-line electronic exception processing, 1A Corp's image-based lockbox system cuts processing time from days to minutes . . . ; Jan. 9, 1996; acs01039031.

Unknown, Business Wire; State of Minnesota using AT&T imaging solution . . . ; Apr. 18, 1994; acs01039027.

Business to Business EIPP Presentment Models and Payment Options Part One Presentment Models.

Cheney, How Effective Were the Financial Saftey Nets in the Aftermath of Katrina, HurricaneKatrinaJan06, Jan. 2006.

Microsoft, CNBC on MSN Money; Microsoft Money 2003 Deluxe.

Unknown, Caere introduces the Model 1800 document remittance processor; compact unit provides cost effective means for low to medium speed document processing; Oct. 19, 1995; acs01039057.

Malyykhina, Elena, Cell Phone Software Formats Checks for Online Banking; InformationWeek; Jan. 24, 2008.

Chapter 1 General Features of the Program.

Chapter 10 Assembling and Submitting Pool and Loan Package Issuance Documents.

Lupo, Lisa Selkin, Chase image-enables NY wholesale lockbox facility with VICOR technology; Aug. 31, 1999; acs01039406.

Anonymous, Chase offers image lockbox for Europe; Aug. 1997; acs01039336.

Huntley, Helen, Class B Mutual Fund Shares Face Increasing Scrutiny Series on Money.

None, Class B Mutual Fund Shares: Do They Make the Grade?

Fukatsu, Sadao et. al., Communication System Between Processes.

Haddad, Charles, et. al., Congratulations, Grads—You're Bankrupt; A Marketing Blitz Buries Kids in Plastic and Debt, May 21, 2001.

Unknown, Crestar to introduce new advanced cash management system based on IA Corp. software; New system will be industry's first, . . . ; Oct. 28, 1996; acs01039059.

Unknown, DMP and IMR Partner to develop electronic archiving solution for wholesale Lockboxes and remittance processing; Mar. 24, 1998; acs01039040.

CardFlash, CARDWEB.COM, Daily Payment Card News (2004).

Bates, Douglas, Data Manipulation in Perl.

Sherer, Paul M., Deals & Deal Makers: Web Ventures Seek to Facilitate Business Credit, Private Equity, Nov. 8, 1999.

Debit Card News—Paperless Trail Leads Debit to a Check-Free Payroll Program, vol. 3, No. 12, Dec. 16, 1997.

Debit Card Services—Invitation for Expressions of Interest, Jul. 1991, acs00277422.

PR Newswire, Delta and American Express Introduce Always Double Miles Feature on Delta SkyMiles Cards.

Deployment Example Single Sign on Load Balancing and Failover Using Sun OpenSSO Enterprise 8.0.

Richburg, Keith et. al., Despite Madoff Guilty Plea Questions Swirl and Rage Boils Victims Gather at Courthouse as Financier Reports to Jail.

Matyas, Stephen M., Digital Signatures—An Overview; pp. 87-94; 1979.

Direct Payment Card, International EBT Pilot Evaluation Pilot Evaluation—Argentina, Jan. 1996, acs00277456.

Cremieux, Pierre-Yves, Does Strike Insurance Matter Evidence from the Airline Industrys Mutual Aid Pact.

Dommitt Diff and Merge Utility for XML.

Lennox, Graeme, Don't Be Tempted by the Urge to Splurge: Zero Rates Sound Great But You'll Pay Dearly in the End, Jul. 2001.

ELoan a Better Way to Get a Loan.

Rolfe, Richard, Europes Cobranding Boom.

Financial Accounting Standards Board, FASB Interpretation No. 41.

FOIA #09-02-12 Responsive Records Book #11 containing Exhibit A, Technical Response, vol. One, Book VII to the Financial Agency Agreement of Jan. 24, 1996, Bates Nos. ACSTRES0002306-ACSTRES0002382.

FOIA #09-02-12 Responsive Records Book #2 containing Financial Agency Agreement of Jan. 24, 1996, dated Mar. 12, 2009, Bates Nos. ACSTRES0000106-ACSTRES0000121.

FOIA #09-02-12 Responsive Records Book #3 containing the Invitation for Expressions of Interest to Acquire EBT Services for the Southern Alliance of States, vol. I, Mar. 12, 2009, Bates Nos. ACSTRES0000122-ACSTRES0000440.

FOIA #09-02-12 Responsive Records Book #5 containing Exhibit A, Technical Response, vol. One, Book I, to the Financial Agency Agreement of Jan. 24, 1996, Mar. 12, 2009, Bates Nos. ACSTRES0000820-ACSTRES0001234.

FOIA #09-02-12 Responsive Records Book #7 containing Exhibit A, Technical Response, vol. One, Book III, to the Financial Agency Agreement of Jan. 24, 1996, dated Mar. 12, 2009, Bates Nos. ACSTRES0001345-ACSTRES0001371.

Friis, M. William; Goodbye to paper?; ABA Banking Journal, Mar. 1989; acs01037874.

Roberts, Leigh, FNB and Nedcor Launch into the New Era of Smart Card Banking; Nov. 15, 1998.

Freddie Mac, Freddie Mac's Document Custody Procedure Handbook.

E-Loan, Frequently Asked Questions, Apr. 2001.

Get it Now and You Could Double Your Frequent Flier Mileage.

Ginnie Mae 5500.

Friis, M William et. al., Goodbye to Paper.

Ostroff, Jeff, Guide to Buying New Cars, Used Cars, Dealer Scams, Feb. 2001, p. 1-7.

Hargreaves, The Evaluation of the Expanded EBT Demonstration in Maryland, Final Report, May 1994, acs00092018.

Business and High ECH Editors Cardtech Securtech 2000, HyperSecur Corporations HyperProximity Technology Now Available on ST16HF52 Microprocessor Chip from STMicroelectronics.

Unknown, IA Corp. announces new CheckVision products; new CheckVision archive software supports short; Apr. 1, 1996; acs01039339.

Unknown, IA Corporation becomes a major player in image-based cash management solutions; Nov. 24, 1995; acs01039052.

Unknown, IA announces installation at QuestPoint of first client/server cash management system with check image storage compatible with IBM, NCR and Unisys; May 29, 1997; acs01039044.

Unknown, IA presents new advanced cash management software at TMA to link banks and their corporate customers; full suite of cash management products allow banks to offer treasury . . . ; Nov. 18, 1996; acs01039049.

Unknown, IA's remit vision adopted by Harris Bank for CD-ROM and online customer viewing of check and remittance documents; continues banking industry trends to use image-based processing as strategic weapon . . . ; May 28, 1996; acs01039042.

IEM Product Description; ACS01066106.

Fitch, Thomas P., Image technology brings lockbox breakthroughs; Sep. 1995; acs01039344.

Andersen Consulting, Image-based transaction processing; The banking industry's challenge for the 1990s and beyond; 1989; acs01039270.

Counterparty Risk Management Policy Group, Improving Counterparty Risk Management Practices.

Tah, J et. al., Information Modeling for a Construction Project Risk Management System.

Toshiba, K, Information Processor e.g. Personal Computer PC.

Information Processor Personal Computer PC has Message Display Unit Which Displays Message Stored in Help Table Corresponding to Indicated Button When Event Process Unit Detects that there is Indication to Button Selected to Override.

Berliner, Uri, Innovative Credit Card Fashions Take Hold Customized Plastic Good for Firms but Users Should Beware.

Khoury, Sarkis, International Banking a Special Look at Foreign Banks in the US.

Request for Information submitted to Department of Health and Human Services by JPMorgan Electronic Financial Services, Request for Information for EBT Services, Aug. 10, 2006.

Alaska Housing Finance Corporation Quarterly Unaudited Financial Statements with Summarized Financial Information for Jun. 30, 2004, and Request for Information Banking Services, Mar. 31, 2005, Bates Nos. ACS-00000143-ACS-00000231.

Kilian-Kehr, Roger, Kilian-Kehr, Mobile Security with Smartcards, Dissertation, Apr. 8, 2002.

Statement of Brian Kibble-Smith, House Committee on Ways and Means, Apr. 5, 2006.

Puller Strecker, Tom, Kiwi Card Converts Unlikely to Lead Smart Revolution; Little Support for Changes to Risk Allocation.

Lewis, David, Lewis, Mortgage Lending Optimized, IntternetWeek, Issue 858, Apr. 23, 2001.

Levin, Katrine, Leveraging Business Method Patents to Protect Broad Business Interests a Technology Company Study.

Tauhert, Christy, Lock box solutions reengineer payments; Aug. 1996; acs01039337.

Mead, Wendy S.; Two Banks' Imaging Deals Target Fee Revenue Increases; The American Banker; May 9, 1997; acs01039019.

Moyer, Liz; Bank of Montreal to Install Imaging System by Unisys for Retail Lockbox Services; The American Banker; Oct. 22, 1996; acs01039023.

Moyer, Liz; KeyCorp joins trend to check imaging for lockbox; The American Banker; Aug. 23, 1996; acs01039004.

Neumeister, Larry, Madoff Will Plead Guilty.

Ota, Michihiko, Massage Communication System.

Schreiber, Ulrich et. al., Measuring the Impact of Taxation on Investment and Financing Decisions.

Davis, Donald, Merchants Unbound.

Merriam Websters Collegiate Dictionary 10th Ed.

Modification # 1 to the Authorization of the Financial Agent and Terms of Performance, Sep. 30, 1993, acs00277482.

Modification # 2 to the Authorization of the Financial Agent and Terms of Performance, Mar. 25, 1994, acs00277490.

Modification # 3 to the Authorization of the Financial Agent and Terms of Performance, Feb. 25, 1995, acs00277500.

Modification # 4 to the Authorization of the Financial Agent and Terms of Performance, Apr. 1, 1996, acs00277507.

Redman, Russell, Mondex Trial Whets Consumers ECash Appetite.

Kahn, Mark, Mutual Strike Aid in the Airlines.

Unknown, NCR introduces 7780 item processing system; image-based system scans and reads documents; Mar. 11, 1992; acs01039038.

Marjanovic, Steven, NationsBank offers lockbox imaging; Jul. 3, 1995; acs01039350.

Unknown, NationsBank rolls out first wholesale lockbox imaging; Aug. 3, 1995; acs01039351.

Shannon, John, New lockbox platform due out at NationsBank; Feb. 1998; acs01039384.

Newton, Harry, Newtons Telecom Dictionary.

Next Generation Service Creation Using XML Scripting Language.

Notice of Reason for Rejection.

Microsoft Corp, Open Financial Exchange.

Opt Out.

Ramsaran, Cynthia, Outside the Bank Co-Branded Cards Take Flight.

Price, Joanne et al.

Feldman, Judy, Pay by Check Over the Phone or Net, Oct. 1999.

Yoshida, K, Payments Program Includes List of Companies Which Provides Credit Cards to User From which one company is Selected Corresponding to Which Payment Data with Purchase Order data are transmitted to Supplier.

Youll, James, Peer to Peer Transactions in Agent Mediated Electronic Commerce, Aug. 2001.

Wolf, Harold A., Personal Finance, (1981).

Buckley, JP et. al., Processing Noisy Structured Textual Data Using a Fuzzy Matching Approach Application to Postal Address Errors; XP-001132075; pp. 195-205 (11 pages); Dec. 2000.

Schutzer, Daniel; Get ready for electronic commerce; ABA Banking Journal; Jun. 1995; acs01038994.

Sessums.

SQL Visual QuickStart Guide.

IBM Technical Disclosure Bulletin, Shared Directory.

Rankl, W., et. al., Smart Card Handbook: Second Edition.

Stiffened Card with Integrated Circuit.

Tax Executive The TEL Wisconsin Chapter—Wisconsin Department of Revenue Liaison Meeting—Tax Executives Institute.

Church, Vernon, Technology Takes the Toll.

Levine, Marvin et al, The Airlines Mutual Aid pact A Deterrent Collective Bargaining.

American Bankers Association, The Bank Credit Card Business, (1996).

Brown, Keith, The Builders Revolution.

Gallant, Victoria, et. al., The Hartford Offers Quick Claim Payment Solution for Customers in Katrina's Path.

Lauricella, Tom et. al., The Madoff Fraud Judge Names Trustee to Liquidate Madoff Firm.

Briggs, Vernon Jr, The Mutual Aid Pact of the Airline Industry.

Nilson, H. Spencer, The Nilson Report, Nov. 1998.

Myers, Randy, The Wired World of Investment Information.

The Workflow Application Architecture.

Piramuthu, Selwyn, Theory and Methodology Financial Credit Risk Evaluation with Neural and Neurofuzzy Systems.

Hitachi Ltd, Track Circuit System Used in Train Detector and Train Operation Control System Has Controller that Dedects Location of Train Based on Input Signals of Transceivers Arranged of Every Area Unit of Predetermined Track.

Track Circuit System Used in Train Detector and Train Operation Control System has Controller that Detects Location of Train based on Input Signals of Transceivers Arranged on Every Area Unit of Predetermined Track.

Track Circuit System Used in Train detector and Train Operation Control System has Controller that detects Location of Train Based on Input Signals of Transceivers Arranged on Every Area Unit of Predetermined Track.

None, U.S. Bank Picks Panini's Check Scanner for Corporate Capture Solution.

Jensen, Cindy, U.S. Bank effectively manages complexity; May/Jun. 2006; acs01039402.

Jensen, Cindy, U.S. bank effectively manages complexity; acs01039398.

Jensen, Cindy, U.S. bank effectively manages complexity; acs01039400.

Walsh, Norman, Understanding XML Schemas.

Unknown, Unknown.

Unknown.

Yee, Bennet, Using Secure Coprocessors, May 1994.

McMonagle, Daniel, VII Cash Balance Plans in a Traditional Defined Benefit World.

VIVO Tech, ViVOtech, Inc. RF-Based Contactless Payment: A more convenient way to pay.

Wood, John et. al., Wood, et al., Electronic Transfer of Government Benefits, Federal Reserve Bulletin, pp. 203-217, Apr. 1997.

Bowen, Cathy, Welfare Agencies Seek Aid From Smart Cards.

Wenninger et al., The Electronic Purse, Current Issues in Economics and Finance, vol. 1, No. 1, Apr. 1995, acs00098037.

Anonymous, What We Like About This Site.

Unknown, Wholesale lockbox imaging; Feb. 1, 1993; acs01039331.

* cited by examiner

CUSTOMER ACTIVATED MULTI-VALUE (CAM) CARD

RELATED APPLICATIONS

This application is a divisional of U.S. patent application Ser. No. 10/370,227 filed on. Feb. 20, 2003 and now U.S. Pat. No. 7,072,864, which is a divisional of U.S. patent application Ser. No. 09/505,189 filed on Feb. 16, 2000 and now U.S. Pat. No. 6,865,547, which is a continuation application of U.S. patent application Ser. No. 09/193,712 filed on Nov. 17, 1998 and now U.S. Pat. No. 6,032,136.

FIELD OF THE INVENTION

The invention generally relates to transaction and payment cards, including credit cards, bank cards, debit cards, telephone calling cards and the like, and more particularly to a transaction card or payment card which can be activated to have an alternative or secondary use as a credit card by adding a credit feature.

BACKGROUND OF THE INVENTION

Today, credit card usage is virtually a part of a customer's daily life because customers recognize the many advantages of obtaining credit cards. For example, credit cards are safer to carry than money, and they can help a customer to establish a good credit rating. Additionally, they can serve as a source of convenience should the customer need to make an unexpected purchase for which they may not have the cash immediately available. As a result of this growing trend, the credit card industry is a booming and profitable industry; thus, customers are constantly inundated with many different credit card offers. For example, customers are offered department store credit cards, gasoline product cards (oil companies), telephone calling cards, VISA® credit cards, MASTERCARD® credit cards, AMERICAN EXPRESS® credit cards, debit cards, and/or the like.

One of the most appealing features of a credit card purchase is that it allows customers to buy now and pay later. Another advantage is that transaction cards permit customers to establish direct relationship with specific types of business, for example, a telephone calling card or a gasoline product payment card. With a gasoline product card, a cardholder has the convenience of purchasing gasoline products from a specific oil company, without conducting a cash transaction, and receiving one itemized bill at the end of the billing period. The itemized billing statement is beneficial for providing businesses or entrepreneurs with a detail summary, at the end of the month or year, of the amount of gasoline which was purchased during the time period and an easy method to calculate business-related mileage to driven during the time period. Another enticement of credit card usage is that some credit card issuers offer to their customers "reward points or reward offers" as an incentive to increase the amount of the customer's purchases or to increase the frequency in which the customer transacts purchases with their credit card.

While customers realize the benefits of obtaining several different types of credit cards and establishing several different types of relationships with different types of industries, customers can sometimes be overwhelmed by the sheer volume of credit cards that they need to carry in order to perform daily activities. Although VISA® and MASTERCARD® are widely accepted, no one card has been accepted universally. Regardless of the fact that VISA® and MASTERCARD® can be used to perform other types of transactions, the usage of a VISA® or MASTERCARD® for the purchase of gasoline or a telephone call usually does not allow the customer to establish a direct relationship with the individual companies enacting the transaction.

Furthermore, using VISA® and/or MASTERCARD® to make a purchase can be more expensive for a merchant because this transaction is treated as a purchase on the VISA® or MASTERCARD® credit card account for which the merchant often pays a transaction fee. Similarly, customers may incur additional expenses when using VISA® and/or MASTERCARD® to perform different types of transactions. For instance, when a customer uses her VISA® credit card to make a telephone call, the telephone company determines the amount of the telephone call and bills the amount directly to the customer's VISA® account. The amount is then entered as a purchase onto the customer's VISA® account and if the customer fails to pay the entire balance by the next billing cycle, the customer also incurs an additional charge based on the current interest rate associated with the account until the entire VISA® account is paid in full. Therefore, a need still exists for a cost-effective method which provides a customer the convenience of using one card which can be easily activated to perform different functions, establish different relationships with different industries (e.g., a phone card, a gas card, a catalog purchasing card, or a dining card) and offer rebate incentives.

Traditionally, the procedure for obtaining a credit card normally requires several steps which can delay the customer's receipt of a functioning credit card for approximately 26-50 days. The normal credit card issuance process begins when the prospective customer receives direct marketing material in the mail or at a merchant's location. Within the next 7-14 days, the prospective customer reads the approximately 500-800 word application, completes the application and returns the application to the credit card issuer through the mail system. Once mailed, it takes another 3-4 days for the paper application to travel through the postal system. The credit card issuer receives the paper application, and over the next 10-20 days, the credit card issuer processes the application to determine whether to accept or decline the customer's application. Thereafter, the customer receives a written response within 5 to 7 days as to whether their application is accepted or declined. If the application is accepted, a functioning credit card often will be included in the written response. After 1 to 5 days, the customer will read the 800-1500 word credit card agreement and then will activate the credit card telephonically before it can be used. However, not all credit card issuers take the additional measure of requiring telephonic activation; some may use a less secure method of mailing active cards.

SUMMARY OF THE INVENTION

The Customer Activated Multi-Value (CAM) card provides a customer with a transaction card with a primary use that is not a credit use, to which the customer can add a credit card feature, as well as other features which can be added to enhance the transaction card's usage. The Customer Activated Multi-Value card can be activated as a non-credit transaction card (e.g., a phone card, a gasoline product card, a catalog purchasing card, a dining card, or the like) or as a transaction card with a credit card feature. Activation of the CAM card as a transaction card allows the customer to purchase goods and services from one specific vendor or several specific vendors who offer the same specific type of product and/or services and to establish a relationship with each vendor for goods or services rendered (for example, a stored-value telephone calling card or gasoline product purchasing card).

An additional enhancement of the CAM card is a rewards feature. The "reward dollars" can be redeemed or spent at the specific vendor or at any other merchant that accepts the transaction logo or mark displayed on the card. Another feature of the CAM card is that it provides the customer with the option to add a credit card feature to the transaction card. By adding the secondary credit card feature to the CAM card, the customer is able to interact with any merchant that accepts traditional credit cards such as VISA®, MASTERCARD®, AMERICAN EXPRESS®, DISCOVER® or the like. In addition, the "reward dollar" points may be used as a credit against the secondary credit feature to reduce the balance of the secondary credit card feature. Even if the credit feature is not activated, customers can still earn reward dollars, cashing them in at retail outlets that accept logos printed on the card, such as MASTERCARD®, VISA®, AMERICAN EXPRESS®, DISCOVER®, any other major credit card, debit card, or the like. In this instance, the open-to-buy amount is equal to the amount of reward dollars accrued.

The reward dollars of the present invention differs from the reward points disclosed in U.S. Pat. No. 5,025,372, assigned to Meridian Enterprises, Inc. (the "Meridian patent"). In order to receive "credits" to or through his or her credit instrument, a participant in the incentive award program disclosed in the Meridian patent must initially reach certain goals or levels of performance. Unlike the Meridian patent, the CAM card does not require the customer to achieve a certain goal or level of performance in order for the customer to receive a credit towards their primary transaction card or secondary credit card feature. The CAM card customer automatically receives a credit every time the customer uses her primary transaction card to transact a purchase. A certain percentage of the total amount spent during each transaction will be used as a credit towards the balance of the customer's secondary credit card feature, or transaction card feature.

Furthermore, the activation process for the CAM is an automated process which significantly reduces the time in which a customer normally has to wait before she can use an active credit card. The automated activation process of the CAM card provides customers with a secure, quick and easy activation process for selecting one or more of the described options. The overall activation process from the date on which the prospective customer receives the direct mail marketing piece, which includes an inactive CAM card, to the date the prospective customer has a functioning transaction card and/or credit card is reduced from an estimated average of 26-50 days to 1-5 days. The number of distinct steps that the customer performs to possess a functioning credit card decreases by approximately 80%. The process for having an active credit card decreases from an estimated average of 10 steps practiced in the traditional process to two steps employed by the novel automated activation process of the CAM card. Upon receipt of the CAM card, the prospective customer reads the marketing material and if she wishes to add the credit card feature she then reads the 800-1500 word cardmember agreement. The prospective customer telephones the CAM activation center and the customer's activation request is automatically processed over the telephone by a live operator or voice response unit (VRU). As an alternative embodiment, the customer may use a personal computer, the Internet or the like to activate the CAM card.

One object of the present invention is a transaction card which has a "sustainable and independent use" and to which a credit card feature can be added at the prospective customer's request.

Another object of the present invention is to improve the efficiency of the overall process of obtaining a credit card by reducing the time from when a prospective customer receives the marketing information to the time the customer has a functioning transaction card and credit card.

Another object of the present invention is to decrease the number of distinct steps that a customer performs to receive a functioning credit card from an estimated average of 10 steps to 2 steps.

It is a further object to provide transaction cards imprinted with the prospective customer's name in a direct mail marketing piece versus traditional methods of direct marketing materials including a paper application or response form that is mailed back to the transaction card provider where the transaction card is not sent to the customer until the paper application or response is processed and approved.

Another object is to have customers activate their transaction card and add their credit card feature automatically versus applying for a transaction card or credit card by completing a paper application which is sent through the mail; thus easing the application process and enhancing the card's security features.

It is still another object to decrease the chance of credit card fraud by requiring that the prospective customer contact the process center and interact directly with a telemarketing representative.

It is still another object that the activation process between the customer and the process center include several levels of safety features built into the system in order to deter theft and/or fraud.

Another object is that the reward dollars may be used as a credit against the secondary credit feature to reduce the balance of the secondary credit card feature.

It is a further object that even if the credit feature is not activated, customers can still earn reward dollars, cashing them in at retail outlets that accept MASTERCARD® and VISA®.

It is still another object that, if the customer chooses not to apply for the secondary credit feature, the customer may still select the "rewards dollars" feature where the open-to-buy amount is equal to the amount of reward dollars accrued.

DETAILED DESCRIPTION OF PREFERRED EMBODIMENTS

The present invention relates to a computer program utilized in conjunction with a transaction card which can be activated automatically and to which the recipient can add a credit card feature as a secondary use card.

The CAM card system (10) provides customers with a relatively quick and efficient method of obtaining a transaction card which can also function as a credit card or other secondary use, if activated to do so.

Figure 1:
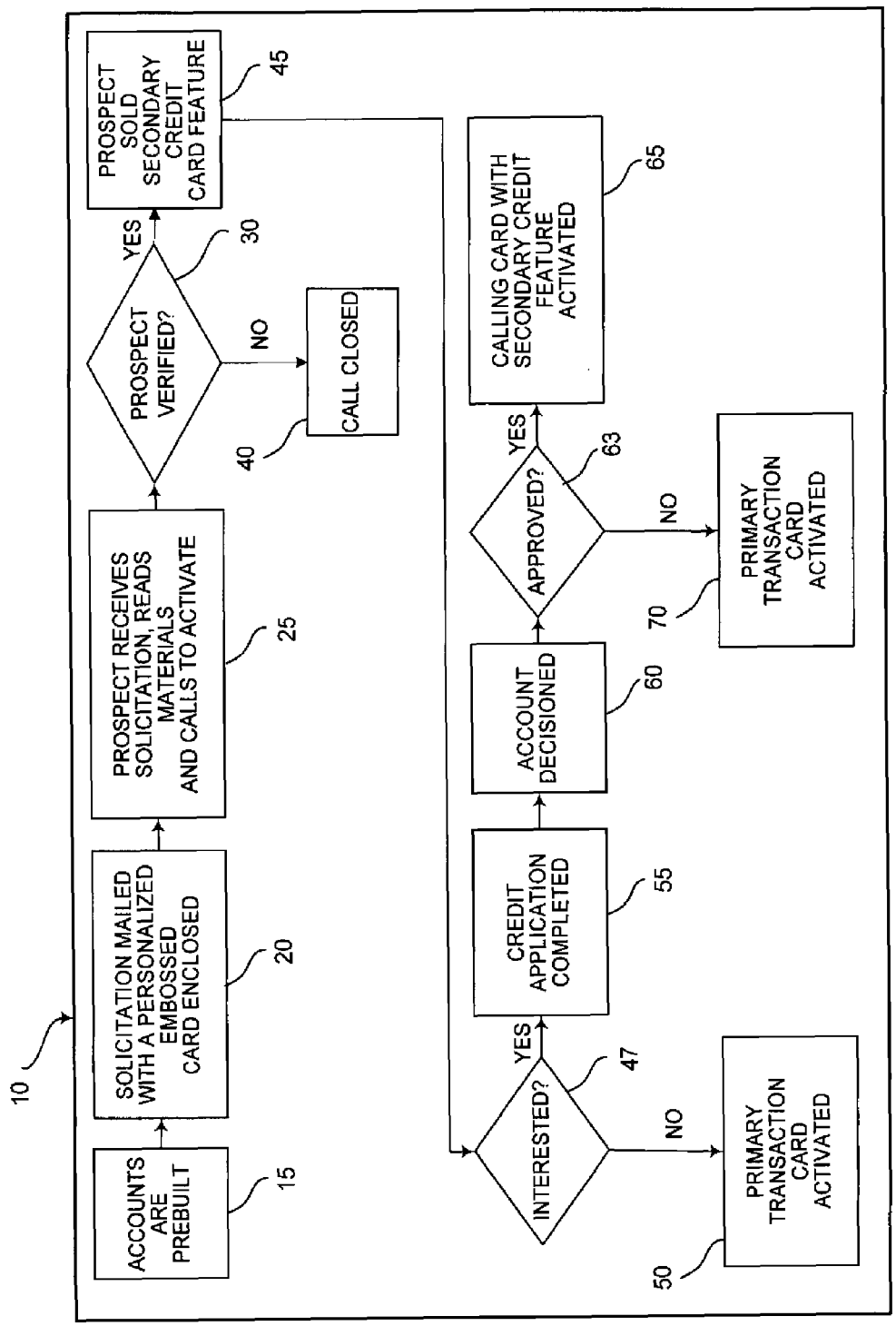
FIG. 1 is a flow diagram of the overall process of the present invention.

Referring to FIG. 1, prior to mailing the solicitations, CAM card accounts are prebuilt (15). The prebuilt accounts (15) provide the system with the capability of automatically activating the customer's account when the customer calls to activate the transaction card (25). The prebuilt accounts (15) are built with a frozen or inactive status; in case the cards are lost or stolen, they cannot be used unless they have been properly activated through the CAM activation process. After the prebuilt accounts (15) are established, an embossing file is created for each prebuilt account The embossing file is used to emboss the cards with the customers' name and account number. A solicitation, containing the marketing information, is mailed to each customer with a personalized, embossed card enclosed (20). Once the prospective customer receives the solicitation, she reads the materials and, if interested, calls the number listed in the package to activate the transaction card (25). In order to deter theft and/or fraud, the prospect is verified during the activation call (30). The safety features are designed to prompt the system to ask the person calling several different questions to ensure that the person calling is the intended customer. If the prospect is not verified, the call is closed (40). If the person is verified, the system advances to the secondary credit card feature offer (45). The customer is asked by the customer service representative whether the customer wants to add the secondary credit card feature (47). If no, the primary transaction card will be immediately activated (50). If the customer wishes to add the credit card feature, a credit application will be completed (55) and automatically decisioned (60) during the activation call. If approved (63), the primary trans-action card including the credit card feature will be activated (65). If the credit application is not approved, only the primary transaction card will be activated (70) automatically during the telephone call.

Figure 2:
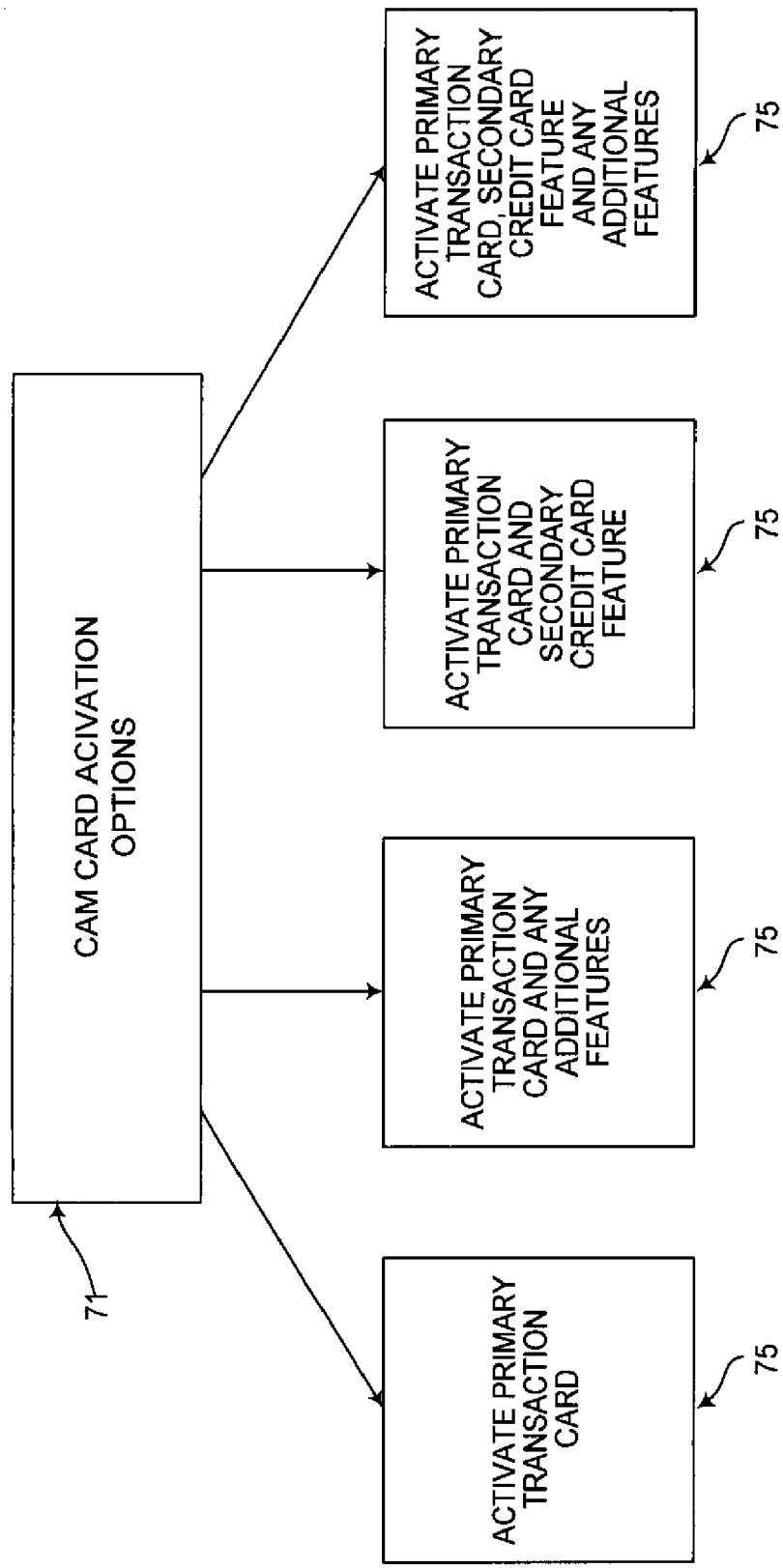
FIG. 2 is a flow diagram of the activation process of the present invention.

More specifically, FIG. 2 illustrates the activation options available to the customer through the CAM card system (71). The customer may decide to activate the primary transaction card feature only (72). Furthermore, the customer may decide to activate the primary transaction feature and add any additional feature(s) (73). In addition to obtaining the primary transaction card, the customer may wish to add the secondary credit card feature (74). Another option provided to the customer is a card that includes the primary transaction card, the secondary credit card feature and any additional features that the CAM system may offer (75).

FIGS. 3A-3D illustrate the basic embodiment of the CAM card activation process telephonically interacting with a live operator, however, a customer may activate the CAM card through the use of a computer, the Internet or the like interacting with a live operator, VRU or a computer. The CAM activation process may be activated by two different initialization processes, the Inbound Call process or Outbound Telemarketing process. The Inbound Call activation process shown in FIG. 3A begins when a prospective customer receives the direct marketing mail piece which contains an inactive transaction card and the optional secondary credit feature terms and conditions. As detailed in FIG. 2, the customer contacts the CAM card automated activation process center (71) to activate the transaction card (72), to activate the transaction card and the secondary credit card feature (73) or to activate the transaction card, the secondary credit card feature and any additional features (74).

If all customer service representatives are busy addressing other customers' request (97) when the prospective customer contacts the CAM activation processing center, the customer receives a customized message (100) until the next customer service representative is available. Once the next customer service representative is available, the CAM system automatically initiates the activation process by maneuvering the customer through several levels of safety features built into the system. In order to deter theft and/or fraud, the safety features are designed to ask the person calling several different questions to ensure that the person calling is the intended customer.

Initially, when a caller contacts the CAM activation process center, the system initiates the Automatic Number Identification (ANI). The ANI automatically checks the telephone number from which the telephone call is made versus the telephone number stored in the system and automatically displayed by the caller identification feature of the system on the GUI (98). If the caller's stored telephone number matches the telephone number from which the caller is calling and the caller informs the customer service representative that he is not interested in participating in any of the services offered, the customer service representative attempts to find out the reason why the customer is disinterested in the program and enters this information into the system (32). The customer service representative closes the call (33) and updates the file on First Data Resources (FDR) (120). FDR is the data processing and statement generating company used by First USA to maintain First USA's credit card account records. FDR (120), the data processor, receives data as to all charges made on the credit card and posts them to the customer's First USA credit card billing statement FDR also maintains the CAM-card customers' and potential customers' files.

Referring to Block (30), should the customer inform the customer service representative that she wishes to activate the CAM card and if the caller's telephone number fails to match the telephone number stored in the system, the system (10) instructs the customer service representative to ask the caller for the account number shown on the transaction card (36). Referring to Block (38), if the customer fails to respond with a valid account number, the system prompts the customer service representative to ask the caller whether she is the person whose name is listed on the transaction card (39). If the caller informs the representative that she is not the person whose name is printed on the transaction card, the customer service representative will inform the caller that the transaction card may be activated only by the person whose name is listed on the card. The customer service representative will then request to speak with the person originally solicited (47) and that the person solicited must call back to activate the card.

Returning to Block (38), if the 12-digit account number fails to match the stored account number and the customer informs the customer service representative that she is the person listed on the card (39), as an additional safety precautionary measure, the customer service representative requests whether the caller is calling from home (41). If the customer indicates that she is calling from home, the system (10) instructs the customer service representative to request the customer's telephone number for the Outbound Telemarketing to call the prospective customer (110) back at a later date. The customer service representative closes out the call since the verification of the customer has failed. The file is updated on FDR (120). The activation center will forward the files to the Outbound Telemarketing process where the customer service representatives will use the newly obtained telephone number to call the prospective customer back, and once the customer identification is verified, the system will attempt the activation process again.

Returning to Block (41) if the customer is not calling from home, the customer service representative informs the customer to call back at a later date from her home telephone (100). Referring back to Block (38), if the account number given by the customer is a valid account number, the customer service representative will ask the customer for their social security number (42). If the last four digits do not match the customer's social security number stored in the system (43), the system returns to Block (110) where the customer service representative requests the customer's telephone number for the Outbound Telemarketing process to call the prospective customer back at a later date. The customer service representative closes out the call since verification of the customer has failed. The file is updated on FDR (120). The activation center will forward the file to the Outbound Telemarketing process where the customer service representatives will call the prospective customer back at a later date and attempt the activation process again once the customer identification is verified.

Referring back to (98), if the customer's telephone number matches the ANI number (30) and the customer is interested in activating the card, the system (10) displays the customer's account number. The customer service representative requests the last eight digits of the account number (37) on the transaction card. If the account number given (51) by the customer fails to match (53) the account number stored in the system or if the customer informs the customer service representative that he or she is unable to provide the transaction card, the system will advance to Block (54). In Block (54), the customer service representative will ask for the customer's telephone number, and the system will automatically forward the customer's account to the Outbound Telemarketing process so that a call can be made to the customer at a later date (54). The customer service representative closes out the call since verification of the customer has failed and updates the file on FDR (120).

Referring back to Block (51), if the 12 digit account number provided by the customer corresponds with the account number stored in the system, the customer has cleared/passed the initial safety precautionary levels and the system automatically moves into the eligibility check (130). Passing the initial safety level means that the ANI (98) correctly identified the caller's telephone number, the eight digit account number provided by the customer matched the information stored within the system and the caller has satisfied all other security checks of the system. Presumptively, clearance of the security check indicates that the "prospective" customer is the person calling to activate the card and has possession of the transaction card. As a result, the system (10) passes the initial safety precautionary questions and automatically performs the eligibility check.

The eligibility check determines what services, if any, the customer has already activated. For a customer who has previously activated the CAM card, the eligibility check also enhances the system's efficiency by preventing the customer from duplicating the initial activation steps each time the customer calls the CAM processing center. Initially, the system (10) checks to verify if the FDR system is down (122). If the FDR is up and operating, the system automatically retrieves the account flags according to the account's current status (140).

If the eligibility check is performed and the customer's account is not assigned a flag of H, I or J, this means that the customer has not previously activated any of the credit services (150). The system will advance the customers account to FIGS. 3B, 3C and 3D respectively, where the customer service representative will attempt to convince the customer activate both the transaction card and add the secondary credit card feature, as well as any other additional features (160).

Returning back to Block (140), if the customer's account generates a flag of H, I or J, this means that the customer has already accepted or activated at least one of the services of the card. If a customer receives a flag of "H," this indicates that the customer has accepted both the transaction card and added the secondary credit card feature. A customer with a "H" flag may want to request a secondary credit card limit increase or may simply wish to speak with the customer service representative about her account. If the customer receives a flag of "I," this informs the customer service representative that the customer has been declined for the credit feature, but accepted the primary transaction card feature. Here, the customer may wish to reapply for the secondary credit card feature in FIGS. 3B and 3C. If the customer receives a "J," the system (10) informs the customer service representative that the customer has been previously declined for the credit feature but rejected the primary transaction card feature. Now, the customer may wish to activate the primary transaction card feature (FIG. 3D) or activate the primary transaction use card and reapply for the secondary credit card feature (FIGS. 3B, 3C and 3D). After the system performs the eligibility check of Block (140), the customer's account is forwarded to either FIG. 3B, 3C, or 3D, depending upon the services desired by the customer (173).

Figure 3A:
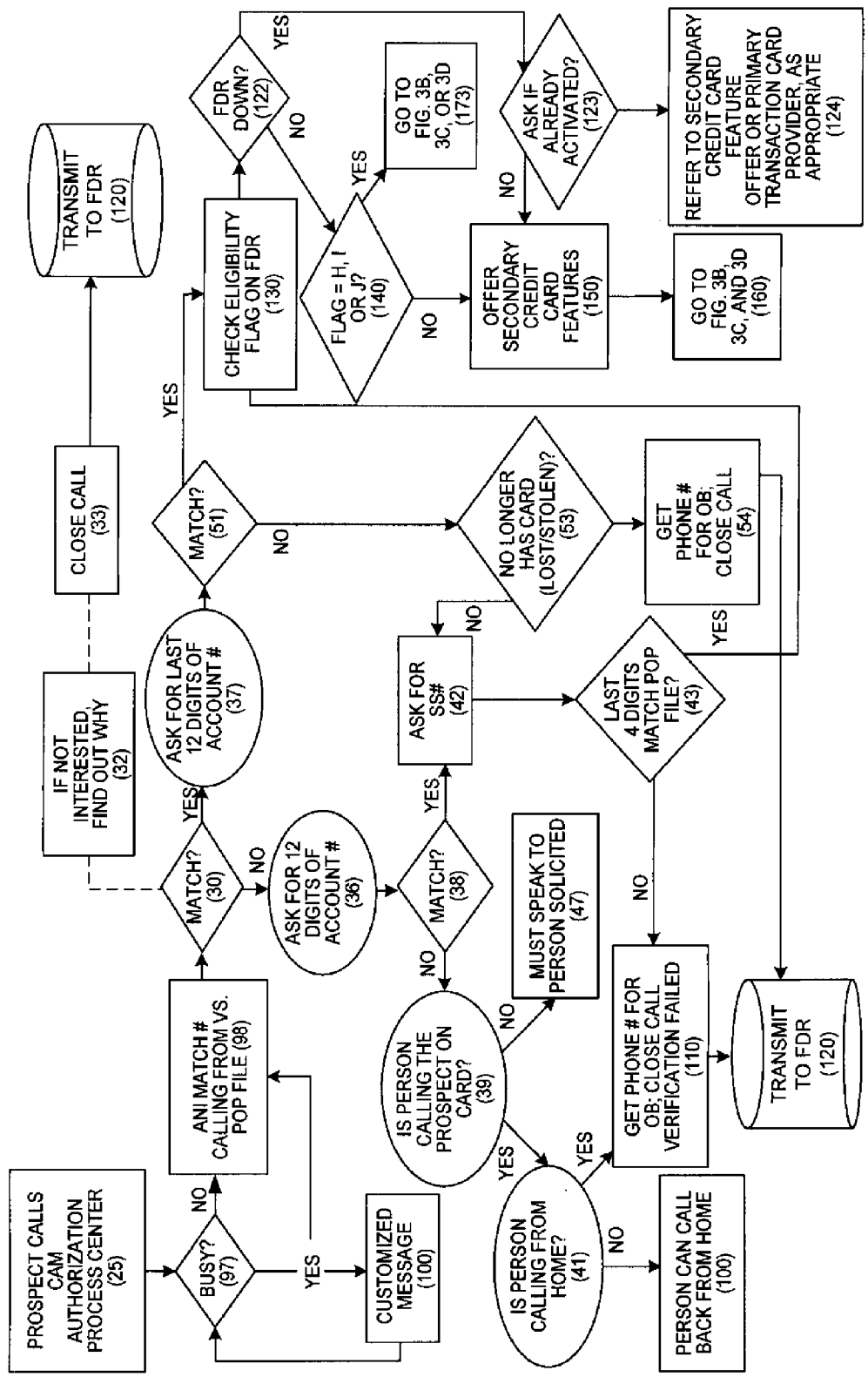
FIG. 3A is a flow diagram of the activation process of the present invention.
Figure 3B:
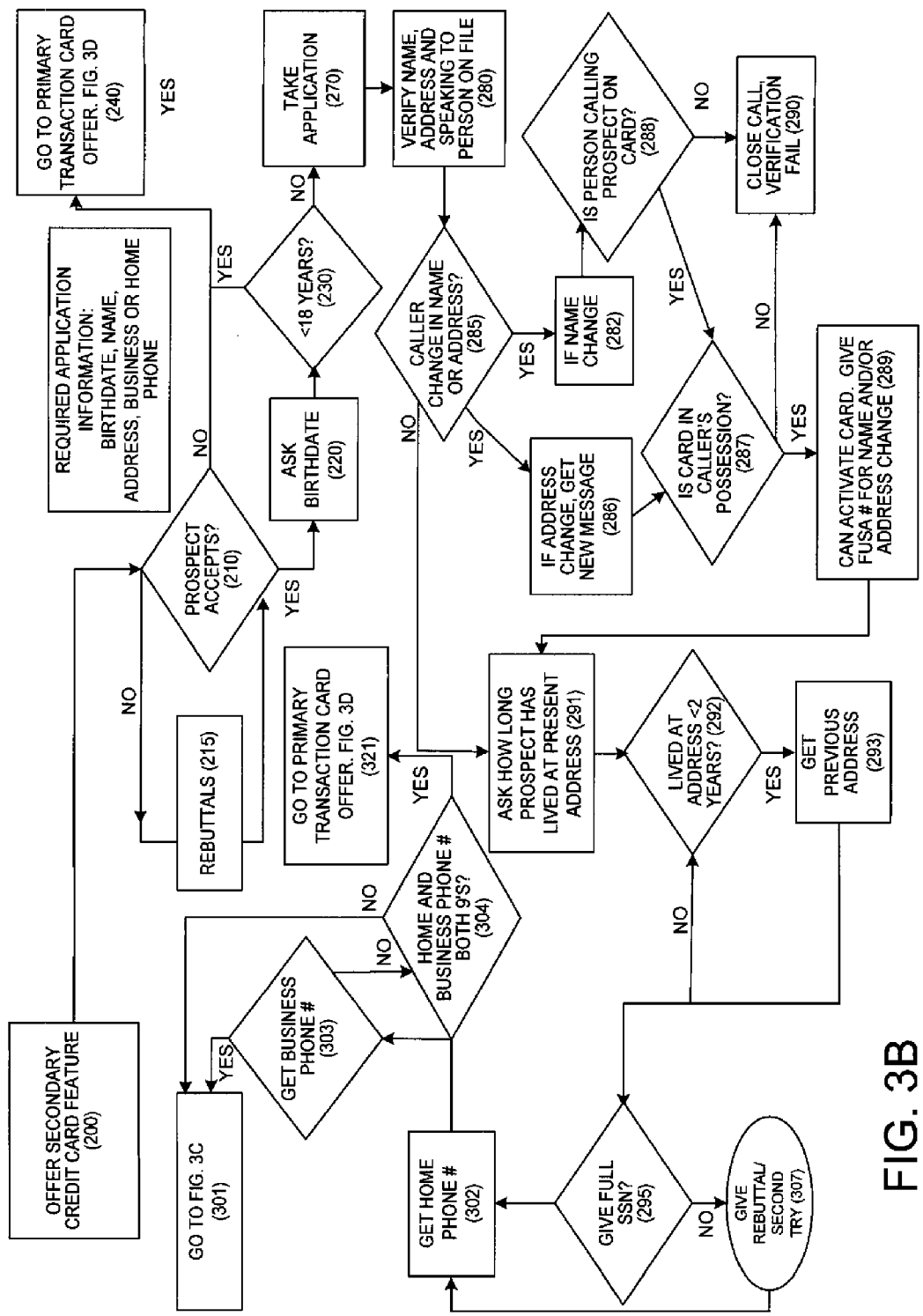
FIG. 3B is a flow diagram of the activation process of the present invention.
Figure 3C:
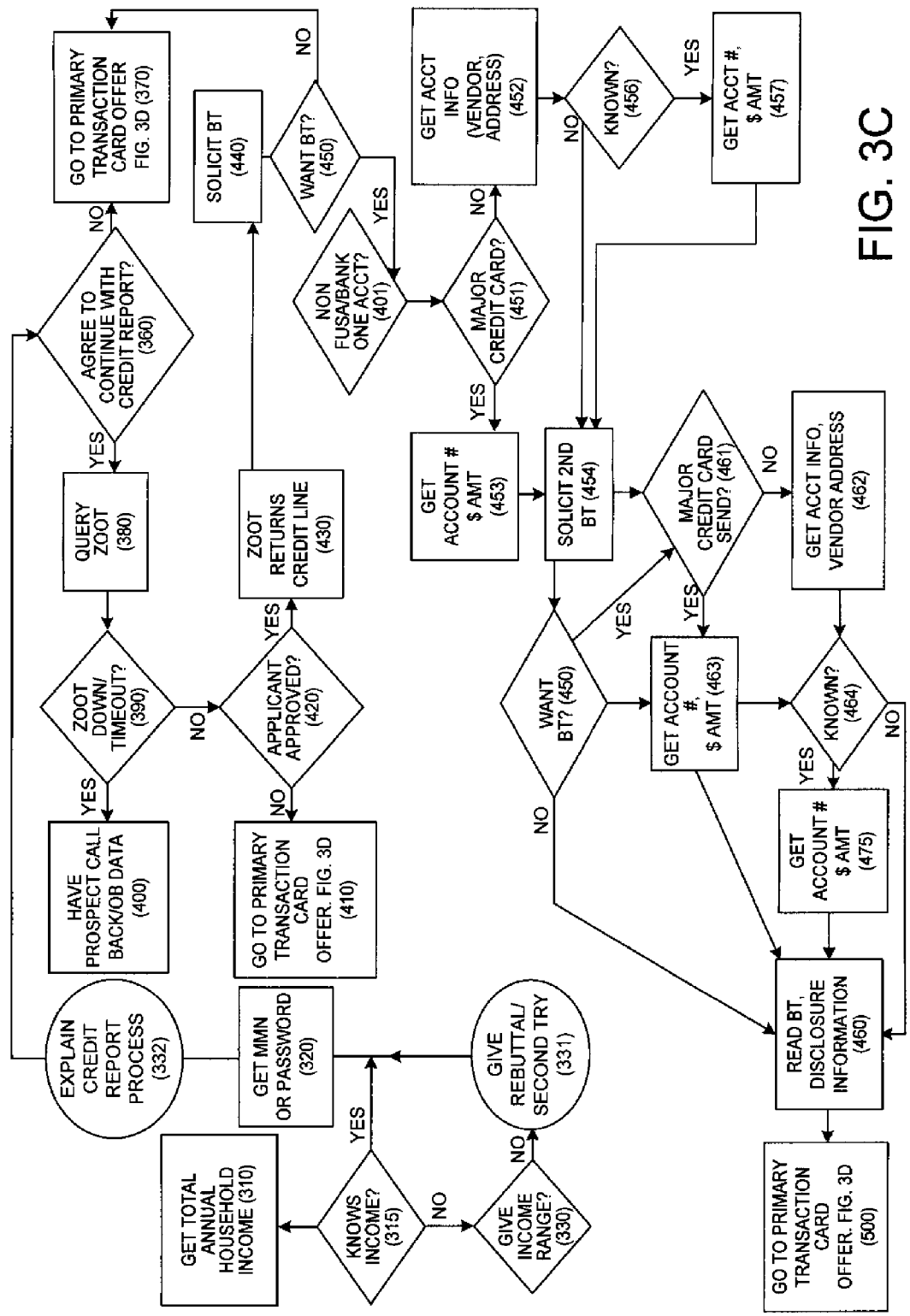
FIG. 3C is a flow diagram of the activation process of the present invention.
Figure 3D:
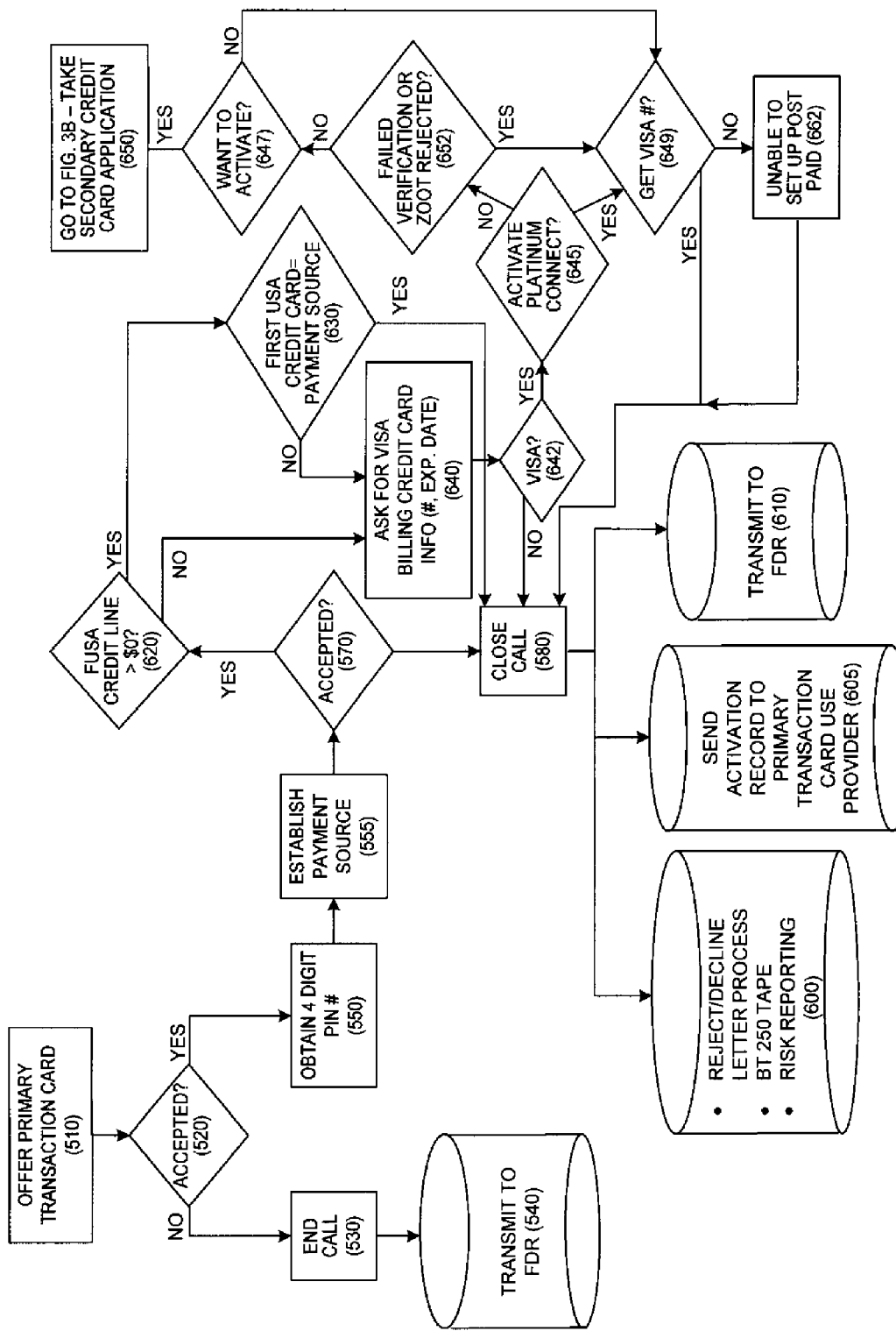
FIG. 3D is a flow diagram of the activation process of the present invention.

Referring back to Block 122 in FIG. 3A, if the FDR system is down, the customer service representative asks the customer if she has already activated the transaction card (123). If the answer is yes, the customer service representative refers the customer's account to the secondary credit card feature offer or to primary transaction card use provider, as appropriate (124). If the answer to Block (123) is "no", then the customer service representative transfers the account to Block (150). The customer is then transferred to block 160 where he is transferred to 3B, 3C, and 3D.

Referring to FIG. 3B, after the customer service representative has made his pitch to the customer to accept the credit card feature (200) and the customer accepts (210), the customer is asked by the customer service representative their birthday (220). If the customer is less than 18 years old, the customer cannot be offered the secondary credit card feature; they can only be offered the primary transaction card use (240). Therefore, the system will forward the customer's account to the primary transaction card use offer (240) which is discussed in FIG. 3D.

Returning to Block (210), if the prospect declines to accept the offer, the customer service representative makes a rebuttal offer in Block (215). This rebuttal is another attempt to get the customer to accept the secondary credit card feature. If the customer declines the credit card feature, the system moves to Block (240) and forwards the customer's account to the primary use offer, in FIG. 3D.

Returning to Block (230), if the customer is over the age of 18, the customer service representative will process the customer's credit card application directly over the phone (270). The information required from the customer to process their credit request over the telephone is the customer's birth date, name, address, and business or home telephone number. The customer service representative will verify the customer's name, address, and, as previously discussed, that the customer service representative is speaking to the person on file (280). If there has been a change in the caller's name or address, the customer service representative will also perform another safety level check (285). If there has been a change in the customer's address, the system will forward to Block (286). After Block (286), the system moves to Block (287) where the customer service representative is prompted to ask the customer if the card is in the caller's possession. If the answer is yes, the card can be activated. The customer will give the customer service representative their new address and telephone number. In Block (291), the customer service representative will then ask the customer "how long have you lived at your present address" If the answer is less than two years (292), the customer service representative to will request the customer's previous address (293). The system (10) then moves to Block (295) where the customer is requested to give his full social security number. If the customer refuses to give his full social security number, the customer service representative will try a rebuttal or a second attempt to get the customer to give their full social security number (307). If the customer still refuses to give his or her social security number, the customer service representative will get the customer's home phone number (302) and will then move to Block (303) to get the customer's business phone number. The system (10) then moves to Block (301) where it transfers the customer's account to Block (310) in FIG. 3C.

Returning back to Block (303) in FIG. 3B, if the customer refuses to give his business number, then the system moves to Block (304). If both the home and business phone numbers are both 9's, the system will forward the account to Block (321), where the customer will be offered primary transaction card use services only. Referring to Block (292), if the customer has lived at the present address for more than two years, the customer service representative is not required to get the customer's previous address.

In Block (285), the system documents a change in the customer's name. If there has been a name change (282), the customer service representative will inquire whether the caller is the prospective customer listed on the transaction card (288). If the answer is "yes", the customer service representative will ask the customer, according to Block (287), is the card in the caller's possession. If the answer to Block (287) or (288) is "no", the customer service representative closes the call because the verification has failed (290). If the answer to Block (287) is "yes", the card can be activated under Block (289) and the system (10) follows the same procedure discussed above.

Referring to FIG. 3C, the customer service representative requests the customer's total annual household income (310). If the customer knows his income (315) and provides the customer service representative with this information, the system then moves to Block (320) to get the customer's mother's maiden name or the customer may provide a password. Returning to Block (315), if the customer is unaware of his income or does not wish to provide his exact income, the customer is asked to give an income range (330). If the customer refuses to give an income range, the customer service representative attempts a second rebuttal to get the customer's income (331). After the rebuttal in Block (331), the customer service representative gets the customer's mother's maiden name or password in Block (320). Then the customer service representative explains the process for obtaining a credit report for the customer in Block (332). If the customer does not wish to continue with the credit check (360), the customer account is transferred by the system and will be offered the primary transaction card use only (370). If the customer agrees to the credit check (360), the system connects to the credit card authorization process (ZOOT) under Block (380). If the credit card authorization process is down (390), the system moves to Block (400). In Block (400), the system will then activate the transaction card use only and instruct the customer service representative to inform the customer to call back at a later time or the customer service representative will forward the customer's account to the outbound calling database so that the customer may be called back at a later date in order to activate the secondary credit card feature.

If the credit bureau is up and running, the system performs the credit check. If the applicant is not approved for the credit card in Block (420), the customer account is transferred by the system and the customer will be offered the primary transaction card in FIG. 3D (510). If the customer is approved, the system is routed to Block (430) and automatically returns a credit line based upon the customer's credit check.

Once the customer's credit line has been established, the customer service representative is instructed by the system (10) to solicit a balance transfer from another credit card to the newly approved credit card (440). If the customer declines the balance transfer offer (450), the system (10) sends the account to Block (370) where the account is automatically processed for the primary transaction card feature.

Returning back to Block (450), if the customer agrees to a balance transfer, the balance transfer process is initiated. The system transfers to Block (401) where the customer is asked, "whether the credit card in which they would like to transfer the balance from is a First USA credit card or not." If the answer is "yes", the balance transfer cannot be performed. If the answer is "no", the customer then provides the name of the major credit card account from which the balance is to be transferred. In Block (451), if the balance is being transferred from a major credit card account, the customer service representative requests the account number and the amount under Block (453). If the account is not a major credit card but a retail card or the like, the customer service representative is instructed in Block (452) to get the account number information and the vendor's name and address. If the customer is unable to provide the vendor's name or address, the balance transfer cannot be processed without this necessary information. The customer service representative is instructed to solicit a second balance transfer in Block (454). Returning to Block (452), if the customer supplies the vendor's name and address, the system moves to Block (457) where the customer service representative obtains the customer's account number and the amount that the customer would like to transfer. Once the initial balance transfer has been solicited in Block (453), the customer service representative solicits a second balance transfer under Block (454). The balance transfer process is initiated once again under Block (450). The customer service representative asks the customer "whether she would like to have a second balance transferred or not." If the customer answers "yes," the customer service representative asks what major credit card account would the customer like to transfer the amount from. If it is a major credit card, under Block (461), the customer service representative enters the account name, number and amount to be transferred under Block (463). The system transfers the customer's file to Block (460). Referring back to the second balance transfer in Block (454), if the credit card is not a major credit card under Block (461), the customer service representative requests the account information and the vendor's address under Block (462). If this information is known (464), the customer service representative inputs the account number and the amount to be transferred (475). If the information is unknown under Block (462), the second balance transfer cannot be performed Only the original balance transfer will be authorized if the initial balance transferred process was completed in the above steps.

The system then moves to Block (460) in order to process the first, second, or both the first and second balance transfers. In Block (460), the balance transfer disclosure information appears on the system's GUI and the customer service representative reads the balance transfer disclosure information to the customer.

A condition of the CAM card is that if the customer is approved for and accepts the secondary credit card feature, the customer must also agree to accept the primary transaction card feature. As a result, once the system completes the secondary credit card activation process in FIG. 3C, the system (10) automatically forwards the customer's account to the primary transaction card offer in FIG. 3D for processing.

Referring to FIG. 3D, the customer service representative asks the customer whether or not they would like to accept the primary transaction card feature (510). If the customer declines the primary transaction card offer (520), the customer's account cannot be activated to receive any services. Thus, the customer service representative ends the telephone call (530), closes out the account and updates the file on FDR (540). If the customer has been approved for the secondary credit card feature and now indicates in Block (520) that she does not wish to activate the primary transaction card, the system (10) prompts the customer service representative to remind the customer that the credit card application is contingent upon her acceptance of the primary transaction card. If the customer still declines the primary transaction card, the customer's account will be closed out. The customer service representative will end the call (530) and then update the account on FDR in Block (540).

If the customer agrees to activate the primary transaction card (520), the system advances to Block (550) where the customer is asked to provide a four-digit PIN number. In order to obtain the primary transaction card use feature, the customer must initially agree to establish a payment source (550). The payment source can be a check, credit card or debit card. If the customer wishes to pay by check, the customer simply mails a check to First USA and once the check is approved, the amount of the check is entered as the payment source for the customer's primary transaction card use. In addition, a customer wishing to establish her payment source by check may have her check automatically processed during the telephone call. If the payment source is a credit card account or a debit card account, the customer authorizes First USA to charge the customer's credit card account or debit card account for the payment source amount. The credit card or debit card can be a First USA card or another major credit card or debit card. After the payment source amount is depleted, the customer may recharge the payment source by adding a new amount to their payment source account by credit card, debit card transfer, or by check.

If the customer decides not to establish a payment source (570), the system advances to Block (580), the customer call is closed out and the customer's account is transferred to Blocks (600), (605) and (610), which will be discussed below.

Returning to Block (570), if the customer agrees to establish a payment source account, the system (10) inquires as to whether or not the customer has a First USA credit card account which has an available credit limit greater than 0 (620). The secondary credit card feature obtained in FIGS. 3B and 3C can also serves as the First USA credit card. If the customer responds affirmatively in Block (620), the customer service representative attempts to persuade the customer to use her FIRST USA credit card as her payment source. If the customer has enrolled in the secondary credit card feature, the system prompts the customer service representative to ask the customer, "whether she would like to have her payment source amount of the primary transaction card posted on her new secondary credit card feature account" (630). If the customer decides not to establish her credit card with a First USA credit card, the system advances to Block (640). Lithe customer agrees in Block (630) to have any charges incurred on her primary transaction card posted on her secondary credit card or her First USA credit card, the CAM card activation process is then complete. The system automatically closes the call in Block (580).

If in Block (620) the customer has previously declined the secondary credit card offer or if the customer's credit application for the secondary credit card has been rejected, the customer may wish to reapply for the secondary credit card in Block (650).

Returning back to Block (620), if the customer's credit card or debt card is not a First USA card, the system then establishes the non-First USA credit card as the payment amount source (640). Under Block (640), the customer must decide whether the payment source amount will be billed to another major credit card, debit credit card or by check. In Block (640) the customer service representative asks the customer to provide information such as the credit card or debit card provider, the credit or debit card account number and/or expiration date of the credit or debit card. Once the customer provides all the account information required in Block (640), the CAM card activation is complete. The system automatically closes the call (580) and advances the customer's account to Blocks (600), (605) and/or (610).

Under Block 600, the system generates a reject/decline letter, the balance transfer information is complied, a risk report is generated, and/or any other necessary information is generated, compiled or processed. The subroutine of Block (605) forwards the customer activation records to the primary transaction card use provider. The customer's account is updated on FDR in Block (610).

Once the primary transaction card feature and/or the secondary credit card feature has been establish, the system includes the "reward dollars" feature, as an additional feature, to the customer's account The "rewards" points may be used as a credit against the secondary credit feature to reduce the balance of the primary transaction card feature or the secondary credit card feature. On the other hand, the customer may spend her reward dollars in at retail outlets that accept MASTERCARD®, VISA®, AMERICAN EXPRESS®, DISCOVER® or the like. Also, the accrued reward points may be used to obtain certain types of gifts, vacations, or other types of prizes offered through award incentive programs. The reward dollars feature is just one example of the additional use features. Other additional use features are available at the customer's option, such as a travel program, a Christmas savings plan or a gift purchasing program are available at the customer's options.

The Outbound Telemarketing Activation process is similar to the Inbound Telemarketing Process, with few exceptions. The scripting read by the customer service representative to the customer is different to reflect the outbound nature of call, verification is different (since our in-house representatives are contacting offerees in their own home), and population file is different (those who are already activated, or those who have requested not to be solicited are not called). The Outbound Telemarketing Activation process is initiated by an outbound customer service representative calling a prospective customer. Once the prospect is obtained, the Outbound process is the same as the Inbound process, discussed above and illustrated in FIGS. 3A-3D.

Although the invention has been described with particular reference to preferred embodiments which are intended to be illustrative rather than restrictive. Alternative embodiments will become apparent to those skilled in the art to which the present invention pertains without departing from its spirit and scope. Thus, variations and modifications of the present invention can be effected within the spirit and scope of the following claims.

The invention claimed is:

1. A multi-feature transaction card, comprising:
    at least one primary feature comprising a debit feature that is activated by a holder of the multi-feature transaction card and is pre-built in an inactive status into the multi-feature transaction card;
    at least one secondary feature, comprising a transaction feature enabling the holder of the multi-feature transaction card to purchase goods or services, the at least one secondary feature being pre-built in an inactive status into the multi-feature transaction card and is activated by a holder of the multi-feature transaction card following activation of the at least one primary feature;
    the multi-feature transaction card being personalized with a name and an account number of the holder prior to being issued to the holder;
    the multi-feature transaction card using one-way transfer of information from the multi-feature transaction card to a merchant; and
    the multi-feature transaction card being capable of functioning with only the primary feature activated.

2. The multi-feature transaction card of claim 1, wherein the multi-feature transaction card comprises a device, or account.

3. The multi-feature transaction card of claim 2, wherein the at least one secondary feature comprises a credit, stored value, transaction, identification or rewards feature, or any combination thereof.

4. The multi-feature transaction card of claim 1, wherein the at least one secondary feature comprises a rewards feature.

5. The multi-feature transaction card of claim 4, wherein the rewards feature can be redeemed at a specific merchant.

6. The multi-feature transaction card of claim 4, wherein the rewards feature can be redeemed or spent at several different merchants.

7. The multi-feature transaction card of claim 4, wherein the rewards feature can be redeemed or spent at any merchant who accepts a logo associated with the multi-feature transaction card.

8. The multi-feature transaction card of claim 4, wherein the rewards feature can be used as a credit against the at least one primary feature or the at least one secondary feature to reduce the balance associated with the multi-feature transaction card.

9. The multi-feature transaction card of claim 4, wherein the rewards feature can be redeemed by the holder.

10. The multi-feature transaction card of claim 1, wherein identification is required to activate the at least one primary and the at least one secondary feature wherein the identification feature comprises at least a telephone number or any other security indicator that is unique to the holder and can be used to authenticate the holder.

11. The multi-feature transaction card of claim 4, wherein the holder receives reward credit every time at least the at least one primary feature is used.

12. The multi-feature transaction card of claim 1, wherein activation of the at least one primary and the at least one secondary feature is an automated process.

13. The multi-feature transaction card of claim 1, wherein the at least one primary and the at least one secondary feature are not activated when the multi-feature transaction card is received by the holder.

* * * * *